(12) United States Patent
Horibe et al.

(10) Patent No.: US 12,053,850 B2
(45) Date of Patent: Aug. 6, 2024

(54) WORKPIECE INSTALLATION METHOD AND WORKPIECE INSTALLATION SUPPORT SYSTEM

(71) Applicant: Yamazaki Mazak Corporation, Niwa-gun (JP)

(72) Inventors: Kazuya Horibe, Niwa-gun (JP); Kazumasa Maruta, Niwa-gun (JP); Hiromasa Yamamoto, Niwa-gun (JP); Hyunkoo Park, Niwa-gun (JP); Masatoshi Itoh, Niwa-gun (JP); Ryuichi Mizukami, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 193 days.

(21) Appl. No.: 17/881,604

(22) Filed: Aug. 5, 2022

(65) Prior Publication Data

US 2022/0371143 A1 Nov. 24, 2022

Related U.S. Application Data

(63) Continuation of application No. PCT/JP2020/005889, filed on Feb. 14, 2020.

(51) Int. Cl.
*B23Q 15/22* (2006.01)
*B23Q 17/24* (2006.01)
*G06T 7/73* (2017.01)

(52) U.S. Cl.
CPC ......... *B23Q 15/22* (2013.01); *B23Q 17/2442* (2013.01); *G06T 7/74* (2017.01); *G06T 2207/30164* (2013.01)

(58) Field of Classification Search
CPC ............... B23Q 15/22; B23Q 17/2442; B23Q 17/2291; B23Q 17/2471; B23Q 17/249;
(Continued)

(56) References Cited

U.S. PATENT DOCUMENTS 10,551,177 B2 * 2/2020 Morimoto ............ G01B 11/254
11,287,264 B2 * 3/2022 Kudrynski ................ G06T 7/55
(Continued)

FOREIGN PATENT DOCUMENTS

CN          105144249       12/2015
CN          105190705       12/2015
(Continued)

OTHER PUBLICATIONS

International Search Report for corresponding International Application No. PCT/JP2020/005889 Apr. 7, 2020.
(Continued)

*Primary Examiner* — Mohamed K Amara
(74) *Attorney, Agent, or Firm* — MORI & WARD, LLP

(57) ABSTRACT

A workpiece installation method includes obtaining a reference image that shows a reference workpiece whose posture has been adjusted, setting workpiece reference lines on a boundary of a first image area occupied by the reference workpiece in the reference image, obtaining a measurement image that shows a workpiece, generating, using a processor, a measurement combined image in which workpiece reference lines are superimposed on the measurement image and which shows the workpiece reference lines pass through positions respectively identical to workpiece reference line positions, and adjusting a posture of the workpiece such that a boundary of a second image area occupied by the workpiece in the measurement combined image is shown to be substantially parallel to or substantially coincident with the workpiece reference lines.

15 Claims, 27 Drawing Sheets

(58) Field of Classification Search
CPC ............ G06T 7/74; G06T 2207/30164; G06T 11/00; G01B 5/008
See application file for complete search history.

(56) References Cited

U.S. PATENT DOCUMENTS

| | | | | |
|---|---|---|---|---|
| 11,798,263 | B1* | 10/2023 | Prabhudesai | ........ G06V 10/764 |
| 2009/0295787 | A1* | 12/2009 | Yao | .......... G06T 11/00 |
| | | | | 345/418 |
| 2014/0025443 | A1* | 1/2014 | Onischuk | ............... G07C 13/00 |
| | | | | 705/12 |
| 2014/0294284 | A1* | 10/2014 | Bryll | .......................... G06T 7/13 |
| | | | | 382/152 |
| 2016/0078681 | A1 | 3/2016 | Shikoda et al. | |
| 2016/0078682 | A1 | 3/2016 | Shikoda et al. | |
| 2016/0133023 | A1* | 5/2016 | Kaestle | ................ G06V 10/242 |
| | | | | 382/218 |
| 2016/0239949 | A1 | 8/2016 | Ogawa | |
| 2019/0095549 | A1* | 3/2019 | De Keyser | .............. G06F 30/13 |
| 2019/0184513 | A1* | 6/2019 | Knorr | ....................... B23Q 7/00 |
| 2019/0380792 | A1* | 12/2019 | Poltaretskyi | ............ G06F 30/20 |
| 2020/0348128 | A1* | 11/2020 | Sasa | ......................... G01B 11/27 |
| 2020/0351447 | A1* | 11/2020 | Marston | ..................... G06T 7/90 |
| 2021/0387301 | A1* | 12/2021 | O'Hare | .................. B25J 9/1697 |
| 2022/0101516 | A1* | 3/2022 | Kweon | .................. G06T 7/0006 |
| 2023/0041378 | A1* | 2/2023 | Abouelela | .......... G06V 10/7715 |
| 2023/0052169 | A1* | 2/2023 | George | ................... G06T 17/00 |

FOREIGN PATENT DOCUMENTS

| | | | |
|---|---|---|---|
| CN | 110672009 | 1/2020 | |
| DE | 102004002103 | 8/2005 | |
| DE | 102016001337 | 8/2016 | |
| EP | 1402967 | 3/2004 | |
| JP | H07-026809 | 3/1989 | |
| JP | 2007-115851 | 5/2007 | |
| JP | 2014-109493 | 6/2014 | |
| JP | 2014-149182 | 8/2014 | |
| JP | WO2014/175324 | 10/2014 | |
| JP | 2014-215748 | 11/2014 | |
| JP | 2017-185535 | 10/2017 | |
| JP | 2018-141707 | 9/2018 | |
| JP | 2019-132731 | 8/2019 | |
| WO | WO-2010041374 A1 * | 4/2010 | ............... B07C 5/10 |

OTHER PUBLICATIONS

Written Opinion for corresponding International Application No. PCT/JP2020/005889 Apr. 7, 2020.
Japanese Office Action for corresponding JP Application No. 2020-521387, Jul. 3, 2020 (w/ English machine translation).
Chinese Office Action for corresponding CN Application No. 202080095937.5, Jan. 4, 2023.
Supplementary European Search Report for corresponding EP Application No. 20918869.7-1103, Mar. 16, 2023.
The International Preliminary Report on Patentability (Chapter I) with translation of Written Opinion for corresponding International Application No. PCT/JP2020/005889, Aug. 25, 2022.

* cited by examiner

WORKPIECE INSTALLATION METHOD AND WORKPIECE INSTALLATION SUPPORT SYSTEM

CROSS-REFERENCE TO RELATED APPLICATIONS

The present application is a continuation application of International Application No. PCT/JP2020/005889, filed Feb. 14, 2020. The contents of this application are incorporated herein by reference in their entirety.

BACKGROUND OF THE INVENTION

Field of the Invention

The present invention relates to a workpiece installation method and a workpiece installation support system.

Discussion of the Background

In machining a workpiece using a numerically controlled machine tool, it is necessary to place the workpiece at a position and a posture intended by the machining program. In light of this situation, work of installing the workpiece is perforated before the workpiece is machined. This work includes placing the workpiece on a table and adjusting the position and posture of the workpiece. JP2011180B discloses a method including capturing an image of a workpiece placed on a table using a visual device, identifying a name of the workpiece based on the image; and calculating a rough position of the workpiece on the table based on data of the image. JP2011180B also discloses a method including attaching a measurement contact probe to a spindle, based on the rough position, performing automatic search to obtain a precise position of the workpiece and precise positions of feature points of the workpiece, obtaining an approximate posture of the workpiece based on a straight line connecting the feature points of the workpiece, and performing a correction to obtain a match between a reference coordinate system of a machining program and a coordinate system of the workpiece on the table.

The method recited in JP2011180B may be applied to a casting or a similar workpiece having an uneven surface. In this case, however, there may occur a difference between a posture of the workpiece estimated based on a straight line connecting feature points measured on the uneven surface of the workpiece and the actual posture of the workpiece. This difference may cause an attachment error equivalent to or greater than a cutting margin at a part of the workpiece. Further, if the workpiece is large in size, there occurs a larger difference between the estimated posture of the workpiece and the actual posture of the workpiece, increasing the possibility of an attachment error equivalent to or greater than the cutting margin. If it is necessary to perform the same machining on a plurality of workpieces and the method recited in JP2011180B is unsatisfactory, it is necessary to obtain and correct the posture of every workpiece using a measurement contact probe, check every workpiece for a posture difference, and, as necessary, obtain the posture of a workpiece again using the measurement contact probe and/or adjust the amount of correction. Under the circumstances, there is a demand for a more efficient method of adjusting the posture of a workpiece.

SUMMARY OF THE INVENTION

According to one aspect of the present disclosure, a workpiece installation method includes placing a reference workpiece on a table, adjusting a posture of the reference workpiece on the table to a workpiece reference posture, setting a configuration of a camera configured to capture an image of the table to a target configuration in which a viewpoint position of the camera is a reference viewpoint position and a line-of-sight direction of the camera is a reference line-of-sight direction, obtaining a reference image that shows the reference workpiece whose posture has been adjusted and that has been captured by the camera whose configuration has been set to the target configuration, setting workpiece reference lines on a boundary of a first image area occupied by the reference workpiece in the reference image, storing workpiece reference line positions in a memory, the workpiece reference lines passing through the workpiece reference line positions in the reference image, placing a workpiece substantially identical in shape and size to the reference workpiece on one table out of the table from which the reference workpiece has been removed and an additional table that has been provided in place of the table, obtaining a measurement image that shows the workpiece and that has been captured by the camera whose configuration has been set to the target configuration, generating, using a processor, a measurement combined image in which the workpiece reference lines are superimposed on the measurement image and which shows the workpiece reference lines are superimposed on the measurement image and which shows the workpiece reference lines pass through positions respectively identical to the workpiece reference line positions, and adjusting a posture of the workpiece on the one table such that the a boundary of a second image area occupied by the workpiece in the measurement combined image is shown to be substantially parallel to or substantially coincident with the workpiece reference lines.

According to another aspect of the present disclosure, a workpiece installation support system includes a table on which a workpiece and a reference workpiece are alternatively replaceable so as to adjust a posture of the workpiece and a posture of the reference workpiece, the workpiece being substantially identical in shape and size to the reference workpiece, a camera configured to capture an image of the reference workpiece on the table, an input device via which workpiece reference lines are set on a boundary of a first image area occupied by the reference workpiece in a reference image that has been captured by the camera and that shows the reference workpiece whose posture has been adjusted to a workpiece reference posture, a memory configured to store workpiece reference line positions, the workpiece reference lines passing through the work reference line positions in the reference image, a processor configured to generate a measurement combined image by superimposing the workpiece reference lines on a measurement image that shows the workpiece captured by the camera when the posture of the workpiece was adjusted on the table such that in the measurement combined image, the workpiece reference lines pass through positions respectively identical to the workpiece reference line positions, a display configured to display the measurement combined image when the measurement image is captured.

According to further aspect of the present disclosure, a workpiece installation method includes obtaining a reference image that shows a reference workpiece placed on a table and that has been captured by a camera, the reference workpiece having a posture adjusted to a workpiece reference posture, a configuration of the camera being set to a target configuration in which a viewpoint position of the camera is a reference viewpoint position and a line-of-sight direction of the camera is a reference line-of-sight direction, setting workpiece reference lines on a boundary of a first image area occupied by the reference workpiece in the reference image, storing workpiece reference line positions in a memory, the workpiece reference lines passing through the workpiece reference line positions in the reference image, obtaining a measurement image that shows a workpiece placed on one table and that has been captured by the camera whose configuration has been set to the target configuration, the workpiece being substantially identical in shape and size to the reference workpiece, the one table being either the table from which the reference workpiece has been removed or an additional table provided in place of the table, generating a measurement combined image in which the workpiece reference lines are superimposed on the measurement image and which shows workpiece reference lines pass through positions respectively identical to the workpiece reference line positions; and displaying the measurement combined image on a display.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
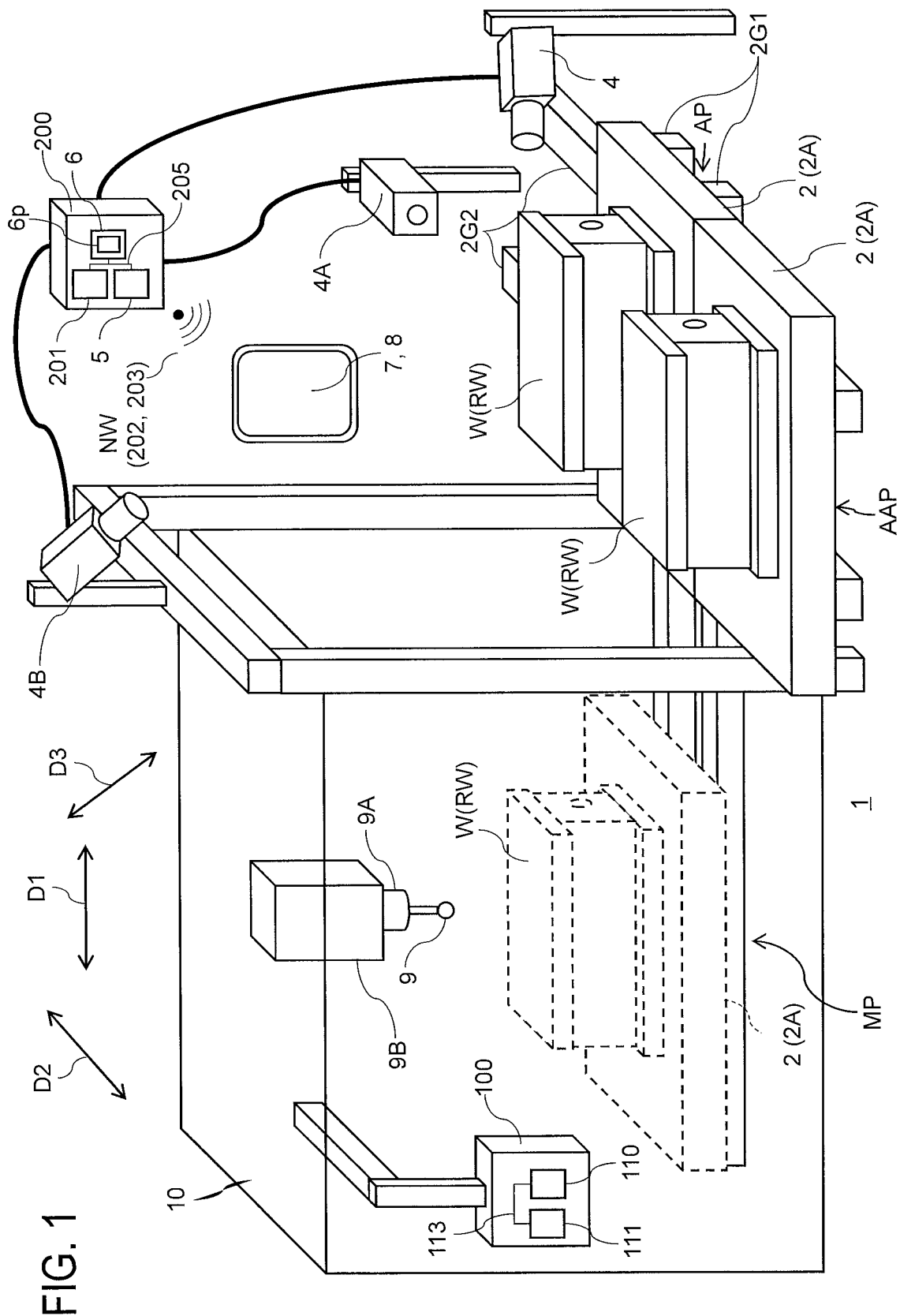
FIG. 1 is an illustration of a schematic configuration of a workpiece installation support system according to a first embodiment.

The present invention will be described in detail below by referring to the drawings illustrating embodiments of the present invention. In the drawings, like reference numerals designate corresponding or identical elements throughout the various drawings.

First Embodiment

System Configuration

FIG. 1 is an illustration of a schematic configuration of a workpiece installation support system 1 according to an embodiment of the present invention. The workpiece installation support system 1 includes a machining apparatus 10, a camera 4, a first additional camera 4A, a second additional camera 4B, an image processing device 200, an input device 7, and a display 8. The machining apparatus 10 includes, for example, a machining center capable of milling. The machining apparatus 10 includes a numerical controller 100, a table 2, and an additional table 2A. It is to be noted that the additional table 2A may be disposed separately from the machining apparatus 10 and connectable to the machining apparatus 10. The image processing device 200 includes a processor 5 and a memory 6. The image processing device 200 may be a dedicated image processing device that processes an image from the camera 4, the first additional camera 4A, and the second additional camera 4B, or may be a general-purpose computer. The image processing device 200 captures images from the camera 4, the first additional camera 4A, and the second additional camera 4B via a known camera input/output interface 201, such as HDMI (®). FIG. 1 illustrates an example in which the input device 7 and the display 8 are implemented in the form of a touch-panel display connected to the image processing device 200 via a wireless network NW. It is to be noted, however, that the input device 7 and the display 8 may be separate terminals such as, for example, a monitor and a mouse, and may be connected to the image processing device 200 via cables. An interface that transmits a signal from the input device 7 to the image processing device 200 may be referred to as a first communication interface 202. Also, an interface that outputs, to the display 8, an image processed through the image processing device 200 or an image input into the image processing device 200 through the camera input/output interface 201 may be referred to as an image output interface 203. In the example illustrated in FIG. 1, the first communication interface 202 and the image output interface 203 are implemented in the form of a wireless communication interface. The processor 5, the memory 6, the camera input/output interface 201, the first communication interface 202, and the image output interface 203 are connected to each other via a bus 205.

The machining apparatus 10 includes: a guide rail 2G1, which extends in a first direction D1; and a guide rail 2G2, which extends in a second direction D2. The table 2 and the additional table 2A are movable to: a machining position MP, at which a workpiece W is machined by the machining apparatus 10; and an arrangement position AP, which is spaced apart from the machining position MP. More specifically, the machining position MP and the arrangement position AP are spaced from each other in the first direction D1, and the table 2 and the additional table 2A are movable along the guide rail 2G1, which extends in the first direction D1. The table 2 and the additional table 2A may be further movable from the arrangement position AP to an additional arrangement position AAP. More specifically, the arrangement position AP and the additional arrangement position AAP are spaced from each other in a second direction D2, which is substantially perpendicular to the first direction D1, and the table 2 and the additional table 2A are movable along the guide rail 2G2, which extends in the second direction D2.

On the table 2, a reference workpiece RW or the workpiece W is selectively placed. On the table 2, the posture of the reference workpiece RW or the posture of the workpiece W can be adjusted. The reference workpiece RW is used to determine a workpiece reference posture, which serves as a basis for adjusting the posture of the workpiece W. The workpiece W is substantially identical in shape and size to the reference workpiece RW. This means that the difference in shape and size between the workpiece W and the reference workpiece RW is less than an error occurrable in the process of producing the workpiece W and the reference workpiece RW. For example, in a case where the reference workpiece RW and the workpiece W are castings produced in the same mold, the difference is less than an error (for example, about a 5 mm in a case of a large-size workpiece) occurrable in molding.

The reference workpiece RW and the workpiece W are placed on the table 2 (additional table 2A) moved to the additional arrangement position AAP, are temporarily fixed to the table 2 (additional table 2A), and are sent to the arrangement position AP. The posture of the reference workpiece RW is adjusted on the table 2 moved to the arrangement position AP. The posture of the workpiece W is adjusted on the table 2 or the additional table 2A moved to the arrangement position AP. The camera 4, the first additional camera 4A, and the second additional camera 4B take images of the reference workpiece RW and the workpiece W on the table 2. More specifically, the camera 4, the first additional camera 4A, and the second additional camera 4B capture an image of one table that is either the table 2 or the additional table 2A moved to the arrangement position AP.

A configuration of the camera 4 is set to a target configuration in which a viewpoint position of the camera 4 is a reference viewpoint position and a line-of-sight direction of the camera 4 is a reference line-of-sight direction. A configuration of the first additional camera 4A is set to a first additional target configuration in which the viewpoint position of the first additional camera 4A is a first additional reference position different from the reference viewpoint position and the line-of-sight direction of the first additional camera 4A is a first additional reference line-of-sight direction non-parallel to the reference line-of-sight direction. The second additional camera 4B whose configuration has been set to a second additional target configuration in which the viewpoint position of the second additional camera 4B is a second additional reference position different from the reference viewpoint position and the first additional reference position and the line-of-sight direction of the second additional camera 4B is a second additional reference line-of-sight direction non-parallel to the reference line-of-sight direction and the first additional reference line-of-sight direction. In the example illustrated in FIG. 1, the reference line-of-sight direction is parallel to the first direction D1, the first additional reference line-of-sight direction is parallel to the second direction D2, and the second additional reference line-of-sight direction (denoted as a third direction D3 in FIG. 1) is inclined with respect to a plane parallel to the first direction D1 and the second direction D2. Thus, it is preferable that two line-of-sight directions among the reference line-of-sight direction, the first additional reference line-of-sight direction, and the second additional reference line-of-sight direction are substantially perpendicular to each other, and that the angle formed by a plane parallel to both the two line-of-sight directions and the remaining line-of-sight direction other than the two line-of-sight directions is larger than 45 degrees. The positions and line-of-sight directions of the camera 4, the first additional camera 4A, and the second additional camera 4B will not be limited to the positions and line-of-sight directions illustrated in FIG. 1, but may be changed to any other positions and line-of-sight directions.

The machining apparatus 10 machines the workpiece W. The machining apparatus 10 may also machine the reference workpiece RW. The machining apparatus 10 includes: a spindle 9A, to which a tool for machining a workpiece is attached; a spindle movement mechanism 9B; and a position measurement sensor 9. The numerical controller 100 includes an electronic circuit 110 and an input interface 111. The position measurement sensor 9 is, for example, a contact probe. The position measurement sensor 9 is attached to the spindle 9A, and the spindle movement mechanism 9B moves the spindle 9A. For example, the position measurement sensor 9 is attached to the spindle 9A in place of the tool attached to the spindle 9A. The electronic circuit 110 is, for example, a controller that performs a machining program. The position measurement sensor 9, the electronic circuit 110, the input interface 111, the spindle 9A, and the spindle movement mechanism 9B are connected to each other via a bus 113 and/or a cable, not illustrated. When the table 2 on which the reference workpiece RW whose posture has been adjusted to the workpiece reference posture is placed moves to the machining position MP, the position measurement sensor 9 measures the positions of reference feature points. The reference feature points are a plurality of feature points on the shape of the reference workpiece RW. When the one table on which the workpiece W whose posture has been adjusted is placed moves to the machining position MP, the position measurement sensor 9 measures the positions of machining reference points on the workpiece W. The machining reference points are a plurality of feature points on a shape identical to the shape of the workpiece W, the feature points respectively corresponding to the reference feature points. Details of the workpiece reference posture and the reference feature points will be described later. The electronic circuit 110 determines whether all the positions of the reference feature points are within a predetermined tolerable range. The electronic circuit 110 also determines whether each of the positions of the machining reference points is within a tolerable range. This tolerable range is set based on the cutting margin of the reference workpiece RW and the workpiece W. A program for the electronic circuit 110 to make the determinations may be referred to as a measurement program. When the determination is that all the positions of the machining reference points are within the respective tolerable ranges, the electronic circuit 110 outputs a determination allowing machining by the machining apparatus 10 to control the machining apparatus to machine the workpiece W. When the determination made by the electronic circuit 110 is that at least one of the machining reference points is not within the tolerable range, the electronic circuit 110 outputs a determination result indicating that machining is not permitted (a determination disallowing the machining). Then, the electronic circuit 110 moves, to the arrangement position AP, the one table on which the workpiece W moved to the machining position MP is placed.

The posture of the reference workpiece RW is adjusted on the table 2 moved to the machining position MP so that all the positions of the reference feature points are within the predetermined tolerable range. When all the positions of the reference feature points have been determined to be within the predetermined tolerable range, the posture of the reference workpiece RW at this determination is the workpiece reference posture. Therefore, when the table 2 on which the reference workpiece RW whose posture has been adjusted to the workpiece reference posture is placed moves to the machining position MP, all the positions of the reference feature points, which are the plurality of feature points of the shape on the reference workpiece RW, are within the predetermined tolerable range.

After the posture of the reference workpiece RW is adjusted to the workpiece reference posture, the camera 4 captures a reference image IB, which shows the reference workpiece RW whose posture has been adjusted to the workpiece reference posture. The first additional camera 4A captures a first additional reference image IBA, which shows the reference workpiece RW whose posture has been adjusted to the workpiece reference posture. The second additional camera 4B captures a second additional reference image IBB, which shows the reference workpiece RW whose posture has been adjusted to the workpiece reference posture. The display 8 displays the reference image IB, the first additional reference image IBA, and the second additional reference image IBB.

A user sets, via the input device 7, camera setting reference lines CRL1 and CRL2 on the boundary of a third image area IR3, which is occupied by a stationary object in the background of the reference image IB. This is for the purpose of checking, in later capturing, whether there is a deviation of the configuration (viewpoint position and line-of-sight direction) of the camera 4 from the target configuration. Thus, the camera setting reference lines CRL1 and CRL2 are set, via the input device 7, on the boundary of the third image area IR3, which is occupied by the stationary object in the background of the reference image IB. Similarly, the user sets, via the input device 7, first additional camera setting reference lines CRL3 and CRL4 on the boundary of an image area BG1, which is occupied by a stationary object in the background of the first additional reference image IBA. Thus, the first additional camera setting reference lines CRL3 and CRL4 are set, via the input device 7, on the boundary of the image area BG1, which is occupied by the stationary object in the background of the first additional reference image IBA. The user sets, via the input device 7, second additional camera setting reference lines CRL5 and CRL6 on the boundary of an image area BG2, which is occupied by the stationary object in the background of the second additional reference image IBB. Thus, the second additional camera setting reference lines CRL5 and CRL6 are set, via the input device 7, on the boundary of the image area BG2, which is occupied by the stationary object in the background of the second additional reference image IBB. It is to be noted that in FIGS. 2 to 4, the third image area IR3, the image area BG1, and the image area BG2, which are occupied by the stationary object, are hatched in the reference image IB, the first additional reference image IBA, and the second additional reference image IBB.

Figure 2:
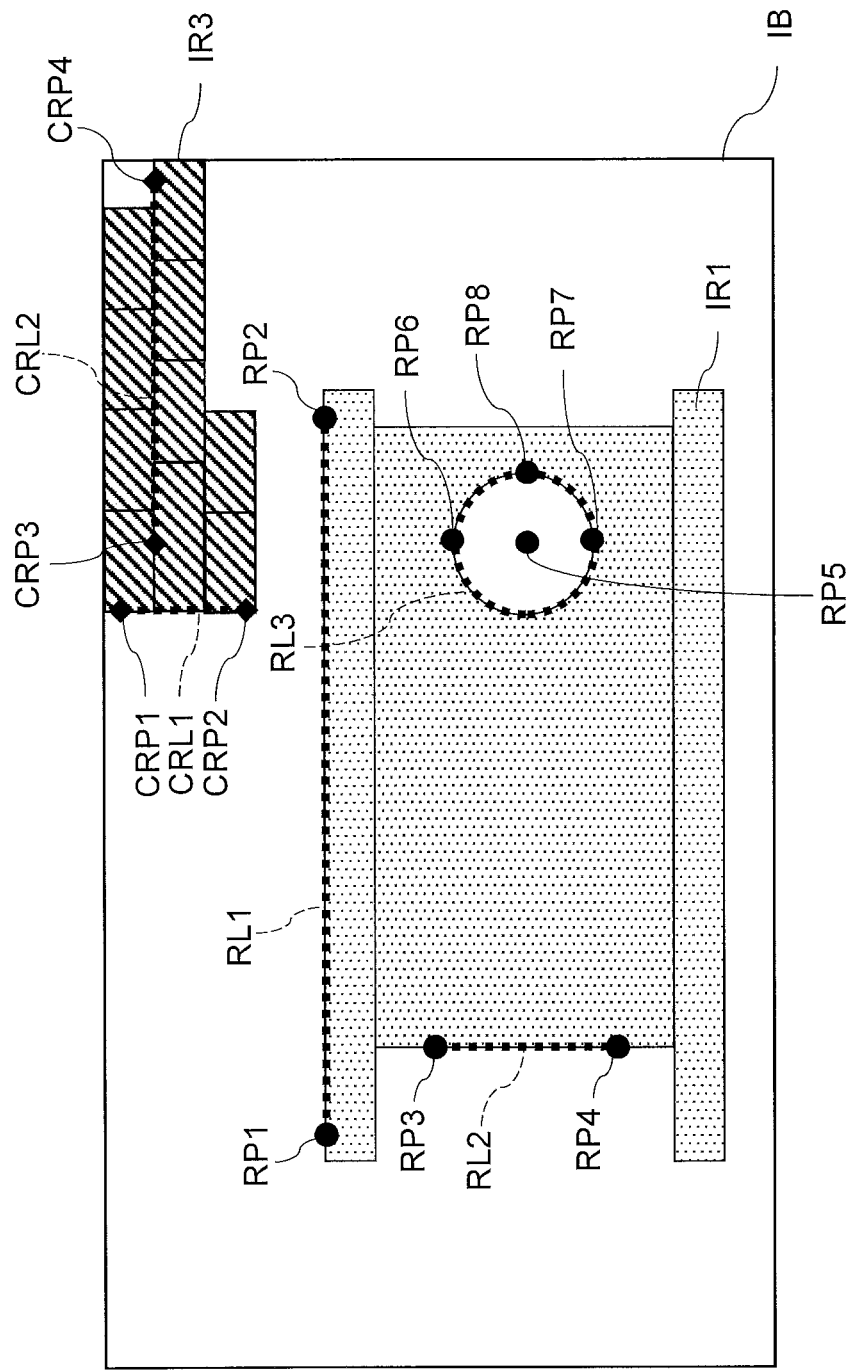
FIG. 2 is an illustration of an example reference image according to the first embodiment.
Figure 3:
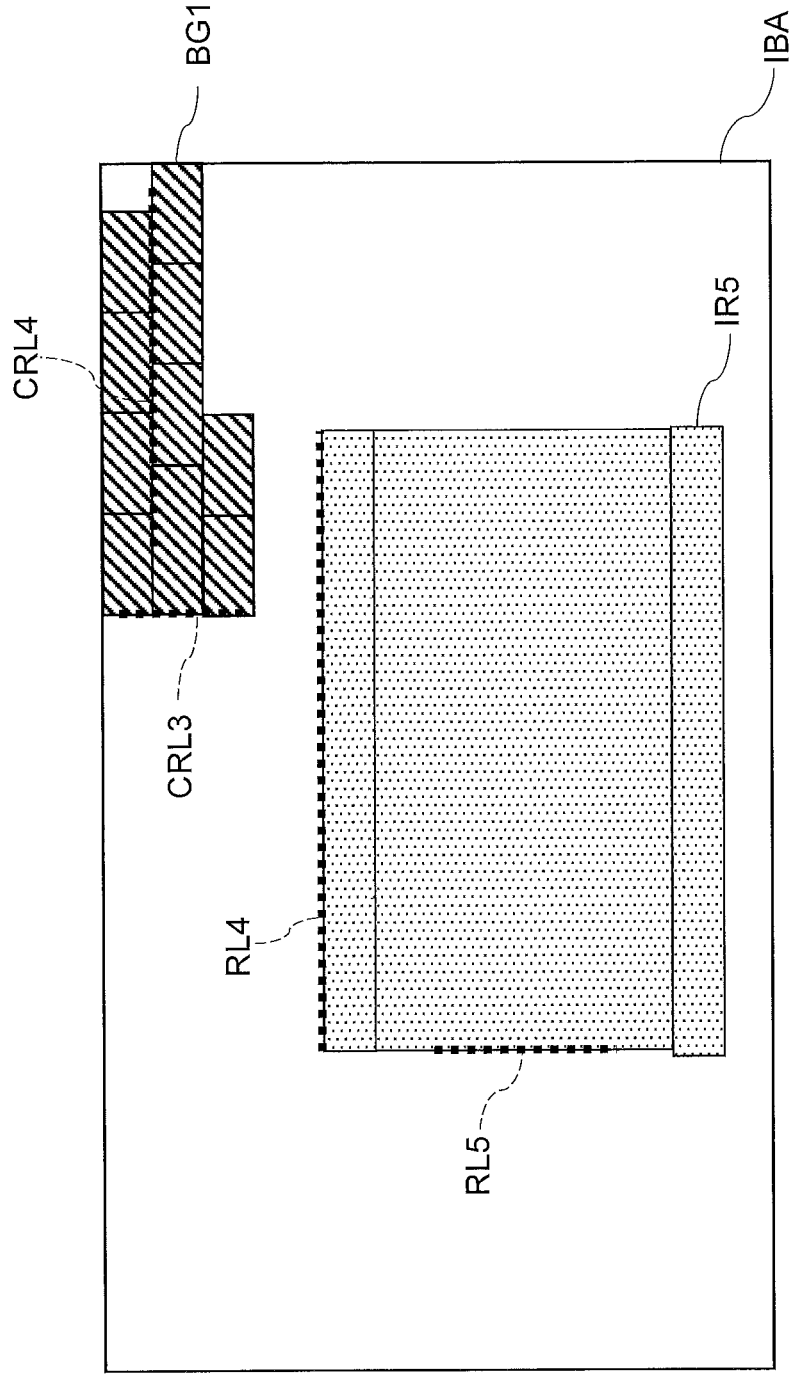
FIG. 3 is an illustration of an example of a first additional reference image.
Figure 4:
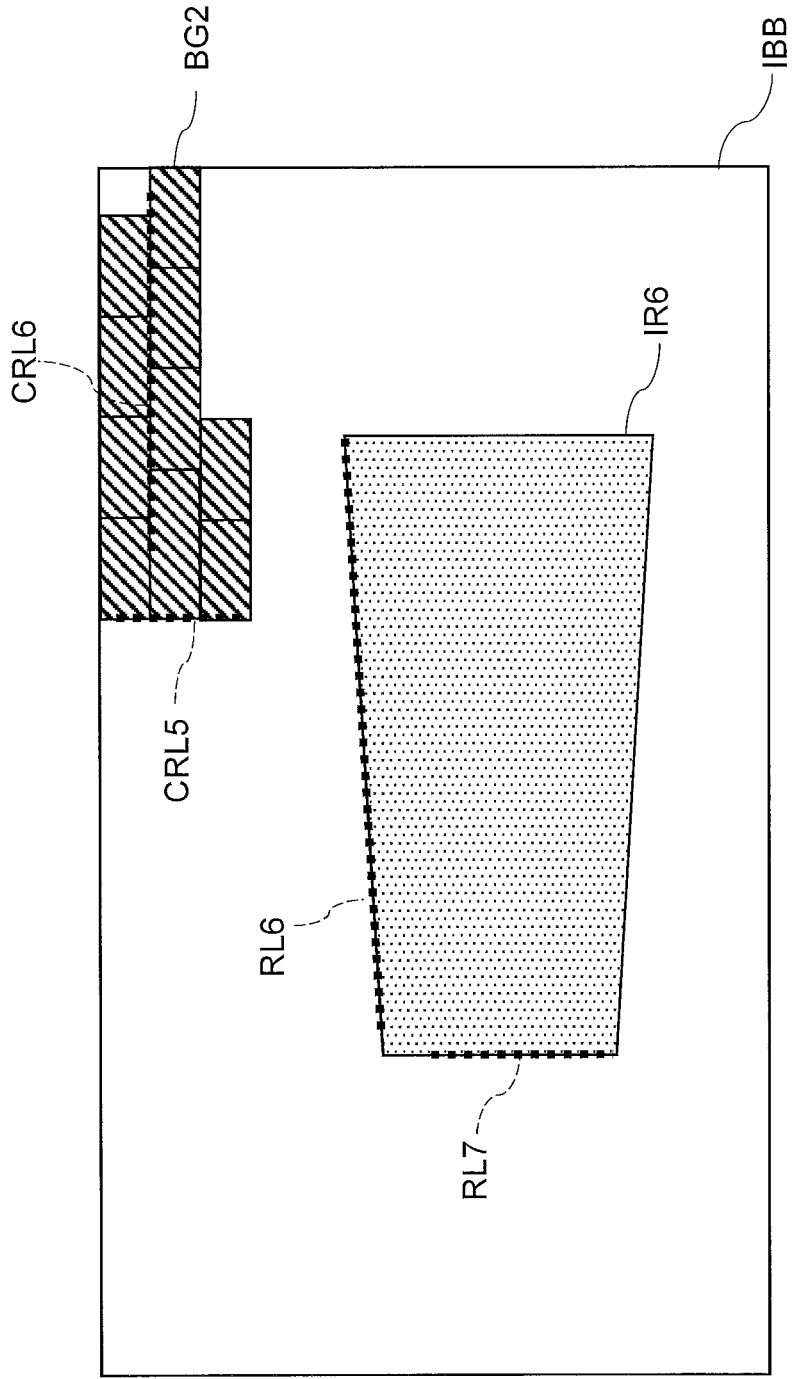
FIG. 4 is an illustration of an example of a second additional reference image.

It is to be noted that as illustrated in FIGS. 2 to 4, each of the camera setting reference lines CRL1 to CRL6 is preferably defined by a straight line. It is also to be noted that the camera setting reference lines CRL1 and CRL2 may be edges of the boundary of the third image area IR3 obtained by image processing performed by the processor 5. Similarly, the first additional camera setting reference lines CRL3 and CRL4 may be edges of the boundary of the image area BG1 obtained by image processing performed by the processor 5. The second additional camera setting reference lines CRL5 and CRL6 may be edges of the boundary of the image area BG2 obtained by image processing performed by the processor 5. In this case, it is possible to, via the input device 7, determine an area to be subjected to edge detection in the reference image IB, the first additional reference image IBA, and the second additional reference image IBB. Alternatively, it is possible to, via the input device 7, select an edge from a plurality of edges detected from the reference image IB, the first additional reference image IBA, and the second additional reference image IBB.

Next, the user takes a look at the reference image IB displayed on the display 8 and illustrated in FIG. 2. While taking a look at the reference image IB, the user sets, via the input device 7, workpiece reference lines RL1 to RL3 on the boundary of a first image area IR1, which is occupied by the reference workpiece RW in the reference image IB. Thus, the workpiece reference lines RL1 to RL3 are set, via the input device 7, on the boundary of the first image area IR1, which is occupied by the reference workpiece RW in the reference image IB. The user takes a look at the first additional reference image IBA displayed on the display 8 and illustrated in FIG. 3. While taking a look at the first additional reference image IBA sets, via the input device 7, first additional workpiece reference lines RL4 and RL5 on the boundary of a fifth image area IR5, which is occupied by the reference workpiece RW in the first additional reference image IBA. Thus, as illustrated in FIG. 3, the first additional workpiece reference lines RL4 and RL5 are set, via the input device 7, on the boundary of the fifth image area IR5, which is occupied by the reference workpiece RW in the first additional reference image IBA. The user takes a look at the second additional reference image IBB displayed on the display 8 and illustrated in FIG. 4. While taking a look at the second additional reference image IBB, the user sets, via the input device 7, second additional workpiece reference lines RL6 and RL7 on the boundary of a sixth image area IR6, which is occupied by the reference workpiece RW in the second additional reference image IBB. Thus, the second additional workpiece reference lines RL6 and RL7 are set, via the input device 7, on the boundary of the sixth image area IR6, which is occupied by the reference workpiece RW in the second additional reference image IBB. It is to be noted that in FIGS. 2 to 4, the first image area IR1, the fifth image area IR5, and the sixth image area IR6, which are occupied by the reference workpiece RW, are each indicated by a polka-dot pattern in the reference image IB, the first additional reference image IBA, and the second additional reference image IBB.

It is to be noted that as illustrated in FIGS. 2 to 4, each of the workpiece reference lines RL1 to RL7 is preferably defined by a straight line or a circle. The workpiece reference lines RL1 to RL3 may be edges of the boundary of the first image area IR1 obtained by image processing performed by the processor 5. Similarly, the first additional workpiece reference lines RL4 and RL5 may be edges of the boundary of the fifth image area IR5 obtained by image processing performed by the processor 5. Similarly, the second additional workpiece reference lines RL6 and RL7 may be edges of the boundary of the sixth image area IR6 obtained by image processing performed by the processor 5. In this case, it is possible to, via the input device 7, determine an area to be subjected to edge detection in the reference image IB, the first additional reference image IBA the second additional reference image IBB. Alternatively, it is possible to, via the input device 7, select an edge from a plurality of edges detected from the reference image IB, the first additional reference image IBA, and the second additional reference image IBB.

The memory 6 stores a plurality of positions in the reference image IB that pass through the workpiece reference lines RL1 to RL3. The memory 6 stores the plurality of positions as workpiece reference line positions. The memory 6 also stores a plurality of positions in the reference image IB that pass through the camera setting reference lines CRL1 and CRL2. The memory 6 stores the plurality of positions as camera setting reference line positions. Each reference line position of the reference line positions is defined as follows. When the reference line is defined by a straight line, the reference line position is defined by the coordinates of the end points of the reference line (such as, in the example illustrated in FIG. 2, RP1 to RP4 and CRP1 to CRP4) in the image coordinate system of the reference image IB. When the reference line is defined by a circle, the reference line position is defined by the coordinates of points for specifying the circle (such as, in the example illustrated in FIG. 2, center point RP5, and points RP6 to RP8 on the circle) in the image coordinate system of the reference image IB. It is to be noted that the coordinates of these points may be expressed by values in sub-pixel units. Similarly, the memory 6 stores a plurality of positions in the first additional reference image IBA that pass through the first additional workpiece reference lines RL4 and RL5. The memory 6 stores the plurality of positions as first additional workpiece reference line positions. The memory 6 also stores a plurality of positions in the first additional reference image IBA that pass through the first additional camera setting reference lines CRL3 and CRL4. The memory 6 stores the plurality of positions as first additional camera setting reference line positions. The memory 6 stores a plurality of positions in the second additional reference image IBB that pass through the second additional workpiece reference lines RL6 and RL7. The memory 6 stores the plurality of positions as second additional workpiece reference line positions. The memory 6 also stores a plurality of positions in the second additional reference image IBB that pass through the second additional camera setting reference lines CRL5 and CRL6. The memory 6 stores the plurality of positions as second additional camera setting reference line positions.

After the above-described processings, the table 2 on which the reference workpiece RW is placed moves to the machining position MP or the additional arrangement position AAP. When the table 2 is moved to the machining position MP, the reference workpiece RW is machined by the machining apparatus 10. Then, one table that is either the additional table 2A on which the workpiece W is placed or the table 2 on which the workpiece W is placed in replace of the reference workpiece RW is moved to the arrangement position AP. When the posture of the workpiece W is adjusted on the one table, the camera 4 captures a measurement image that shows the workpiece W. Similarly, the first additional camera 4A captures a first additional measurement image that shows the workpiece W. The second additional camera 4B captures a second additional measurement image that shows the workpiece W.

The processor 5 generates a measurement combined image IS. In this measurement combined image IS, the camera setting reference lines CRL1 and CRL2 are superimposed on a measurement image. The processor 5 generates the measurement combined image IS which shows the camera setting reference lines CRL1 and CRL2 passing through positions respectively identical to the camera setting reference line positions. The processor 5 also generates a measurement combined image IS. In this measurement combined image IS, the workpiece reference lines RL1 to RL3 are superimposed on a measurement image that shows the workpiece W captured by the camera 4 when the posture of the workpiece W was adjusted on the one table. The processor 5 generates the measurement combined image IS which shows the workpiece reference lines RL1 to RL3 pass through positions respectively identical to the workpiece reference line positions. The display 8 displays the measurement combined image IS when the measurement image is captured.

Figure 5:
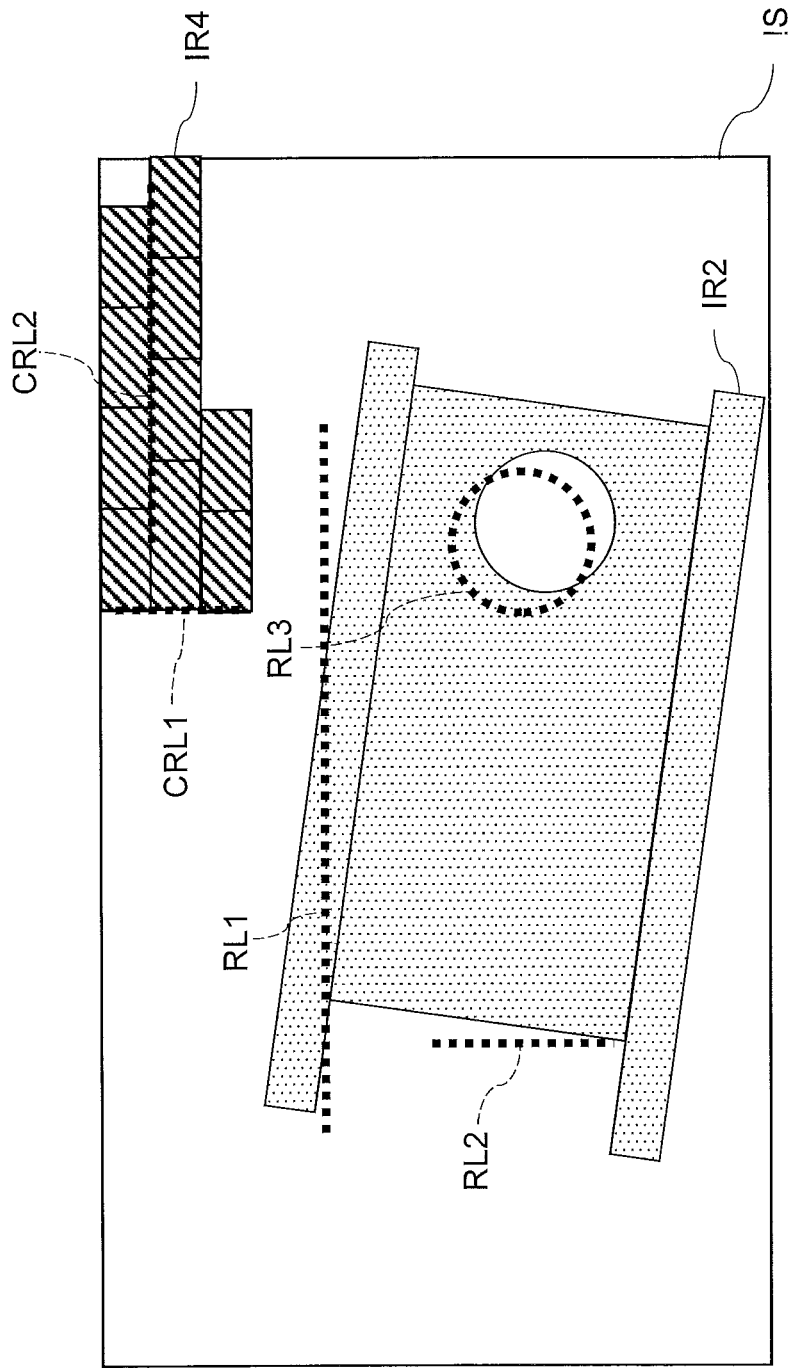
FIG. 5 is an illustration of an example measurement combined image according to the first embodiment.

FIG. 5 is an illustration of an example of the measurement combined image IS according to the first embodiment. In the measurement combined image IS illustrated in FIG. 5, a second image area IR2, which is occupied by the workpiece W, is indicated by a polka-dot pattern. Also in the measurement combined image IS, the boundary of a fourth image area IR4, which is occupied by the stationary object and corresponds to the third image area IR3, is indicated by hatching. First, the user adjusts the configuration of the camera 4 while referring to the measurement combined image IS so that the boundary of the fourth image area IR4, which is occupied by the stationary object in the measurement combined image IS, overlaps with the camera setting reference lines CRL1 and CRL2. Thus, the configuration of the camera 4 is set to the target configuration when the measurement image is captured.

Figure 6:
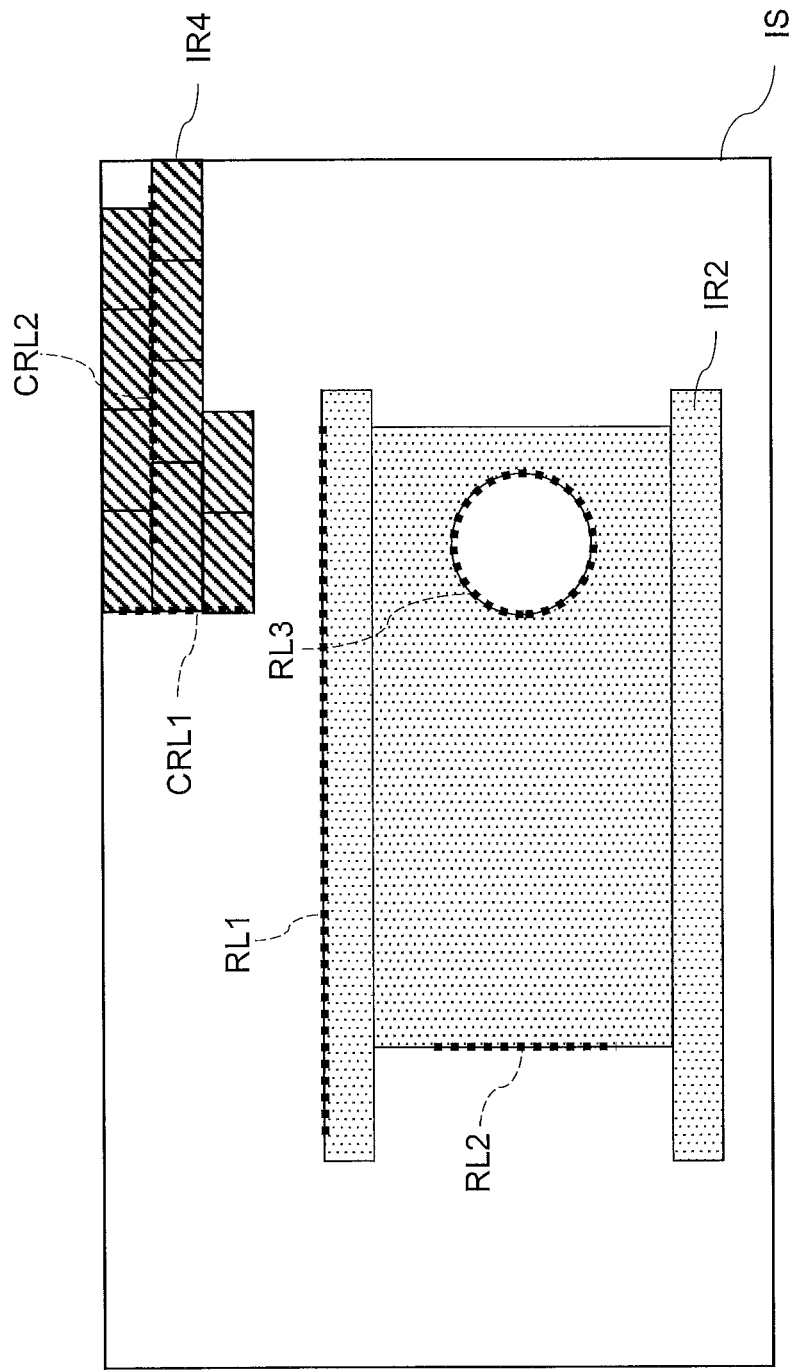
FIG. 6 is an illustration of an example measurement combined image according to the first embodiment with the posture of a workpiece adjusted.
Figure 7:
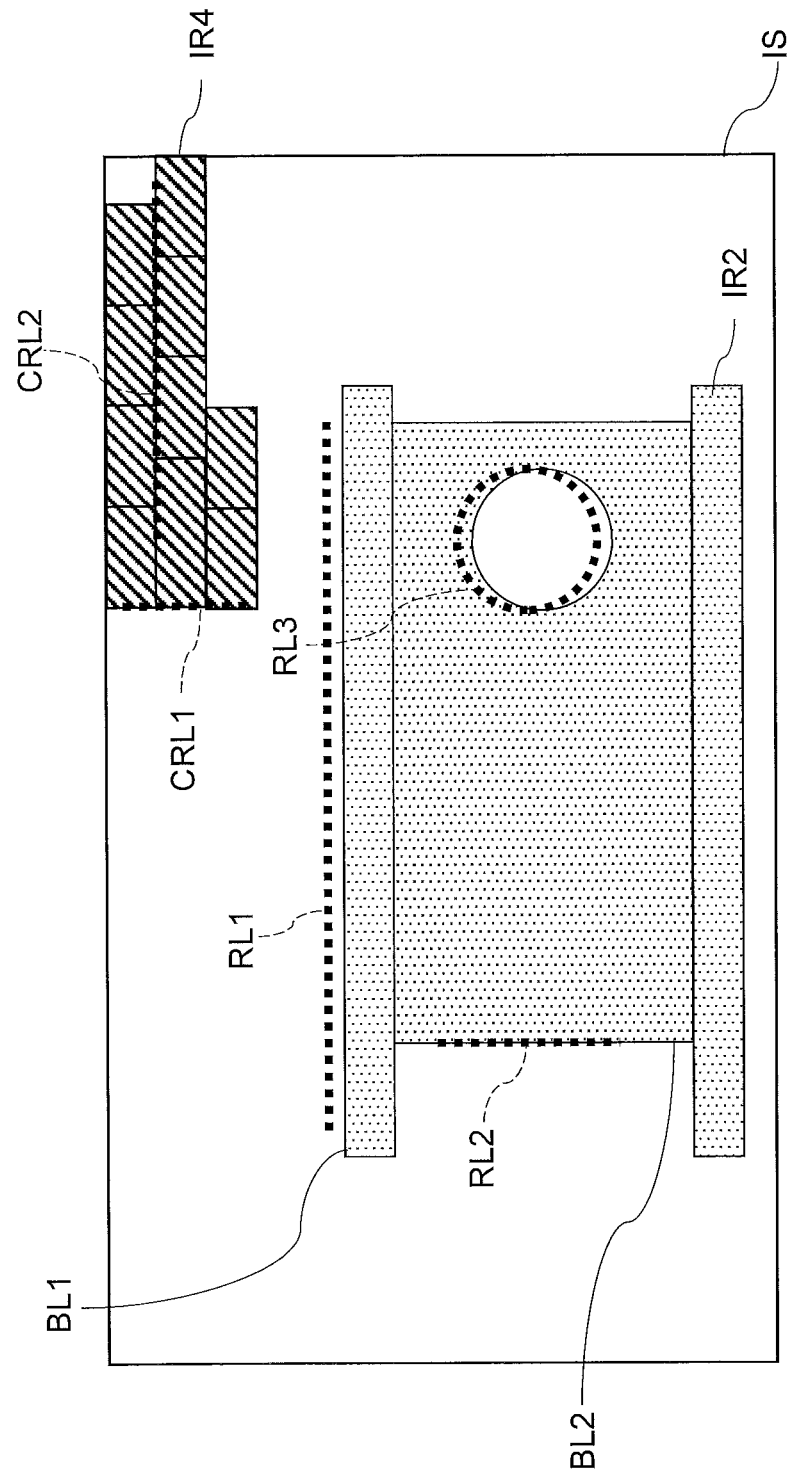
FIG. 7 is an illustration of another example measurement combined image according to the first embodiment with the posture of the workpiece adjusted.

Next, the user adjusts the posture of the workpiece W on the one table such that the boundary of the second image area IR2, which is occupied by the workpiece W in the measurement combined image IS, and the workpiece reference lines RL1 to RL3 are substantially parallel to each other or substantially coincident with each other. Thus, "substantially parallel" in this context means within deviation from "accurately parallel" which is caused by visual observation. "Substantially coincident" in this context means within deviation from "accurately coincident" which is caused by visual observation. FIGS. 6 and 7 illustrate examples of the measurement combined image IS showing the workpiece W whose posture has been adjusted in the above-described manner. FIG. 6 illustrates an example in which the workpiece reference lines RL1 to RL3 are substantially coincident with the boundary of the second image area IR2. FIG. 7 illustrates an example in which the workpiece reference lines RL1 to RL3 are substantially parallel to the boundary of the second image area IR2. In FIG. 7, the workpiece reference line RL1 and the boundary line, BL1, of the second image area IR2 are spaced from each other such that the workpiece reference line RL1 and the boundary line BL1 are parallel to each other, whereas the workpiece reference line RL2 and the boundary line, BL2, of the second image area IR2 are substantially coincident with each other. Thus, the phrase "the boundary of the second image area IR2 is substantially parallel to the workpiece reference lines RL1 to RL3" may be such that the boundary of the second image area IR2 and one or some of the workpiece reference lines RL1 to RL3 are substantially coincident with each other, or may be such that the distances between the boundary of the second image area IR2 and the workpiece reference lines RL1 to RL3 are different from each other.

Figure 8:
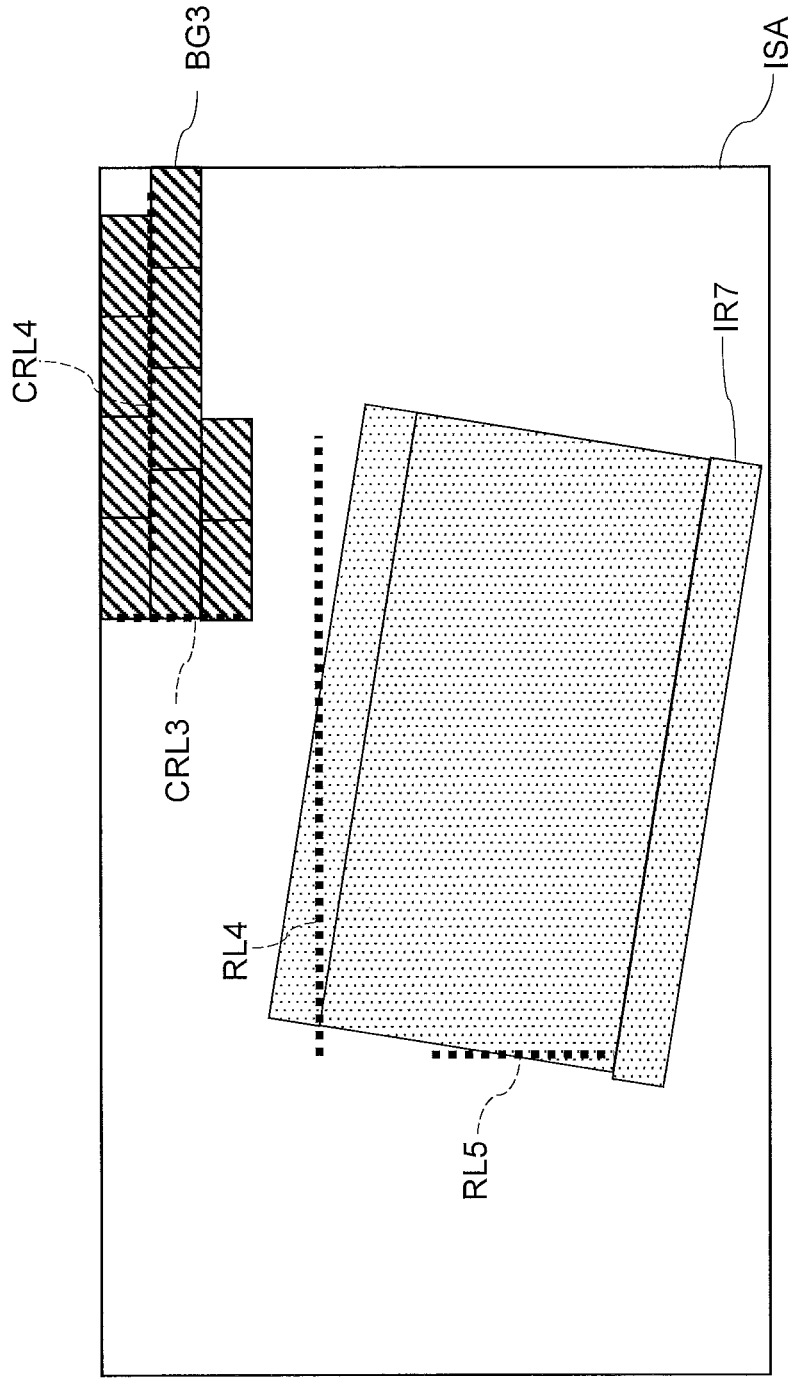
FIG. 8 is an illustration of an example first additional measurement combined image.
Figure 9:
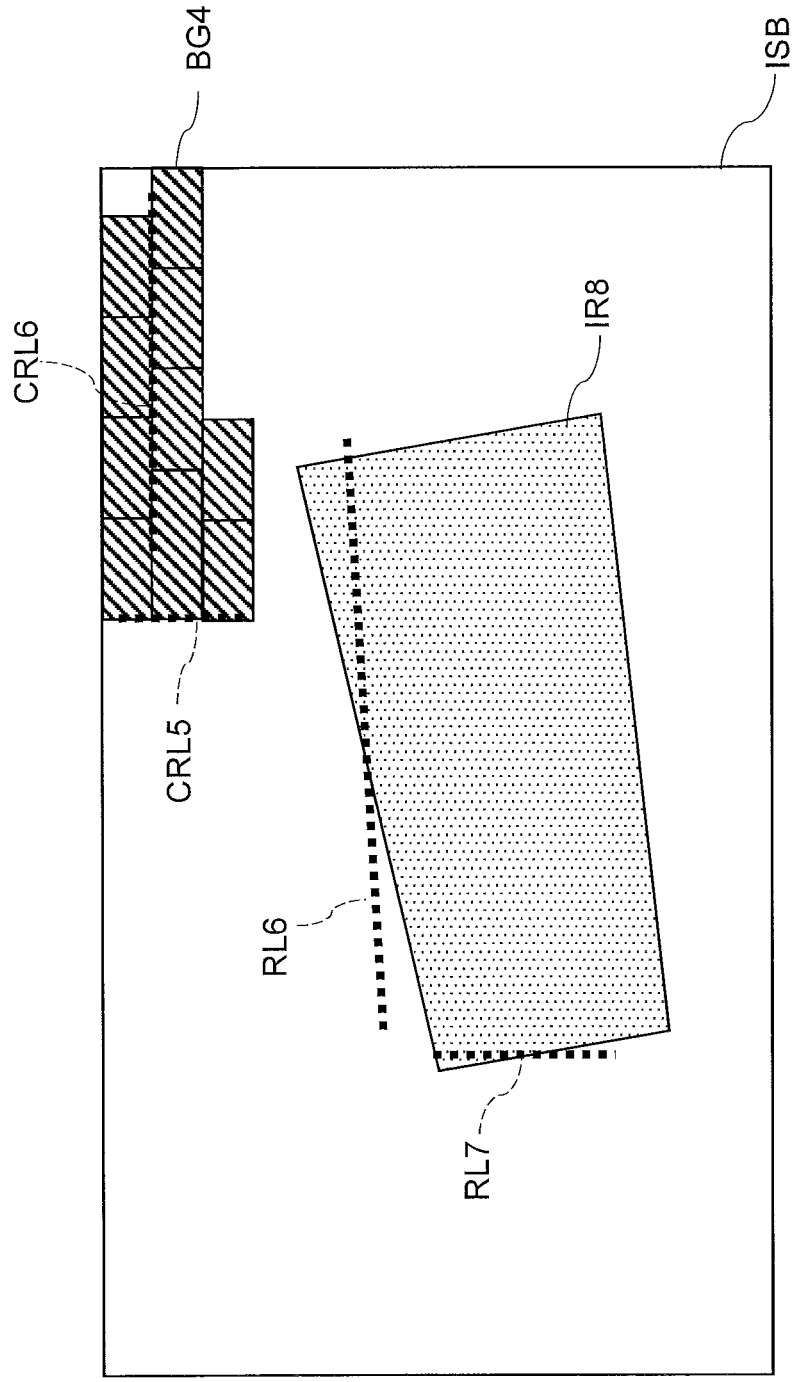
FIG. 9 is an illustration of an example second additional measurement combined image.

The processor 5 and the display 8 perform processings similar to the above-described processings on the first additional measurement image and the second additional measurement image. Specifically, as illustrated in FIG. 8, the processor 5 generates a first additional measurement combined image ISA. In this first additional measurement combined image ISA, the first additional camera setting reference lines CRL3 and CRL4 are superimposed on the first additional measurement image. The processor 5 generates the first additional measurement combined image ISA which shows the first additional camera setting reference lines CRL3 and CRL4 pass through positions respectively identical to the first additional camera setting reference line positions. The processor 5 generates a first additional measurement combined image ISA. In this first additional measurement combined image ISA, the first additional workpiece reference lines RL4 and RL5 are superimposed on the first additional measurement image. The processor 5 generates the first additional measurement combined image ISA which shows the first additional workpiece reference lines RL4 and RL5 pass through positions respectively identical to the first additional workpiece reference line positions. As illustrated in FIG. 9, the processor 5 generates a second additional measurement combined image ISB. In this second additional measurement combined image ISB, the second additional camera setting reference lines CRL5 and CRL6 are superimposed on the second additional measurement image. The processor 5 generates the second additional measurement combined image ISB which shows the second additional camera setting reference lines CRL5 and CRL6 pass through positions respectively identical to the second additional camera setting reference line positions. The processor 5 generates a second additional measurement combined image ISB. In this second additional measurement combined image ISB, the second additional workpiece reference lines RL6 and RL7 are superimposed on the second additional measurement image. The processor 5 generates the second additional measurement combined image ISB which shows the second additional workpiece reference lines RL6 and RL7 pass through positions respectively identical to the second additional workpiece reference line positions. The display 8 displays the first additional measurement combined image ISA when the first additional measurement image is captured. The display 8 displays the second additional measurement combined image ISB when the second additional measurement image is captured.

While referring to the first additional measurement combined image ISA, the user adjusts the configuration of the first additional camera 4A such that the boundary of the image area BG3, which is occupied by the stationary object (the stationary object corresponding to the image area BG1) in the first additional measurement combined image ISA, overlaps with the first additional camera setting reference lines CRL3 and CRL4. This ensures that the configuration of the first additional camera 4A is set to the first additional target configuration when the first additional measurement image is captured.

While referring to the second additional measurement combined image ISB, the user adjusts the configuration of the second additional camera 4B such that the boundary of the image area BG4, which is occupied by the stationary object (the stationary object corresponding to the image area BG2) in the second additional measurement combined image ISB, overlaps with the second additional camera setting reference lines CRL6 and CRL5. This ensures that a configuration of the second additional camera 4B is set to the second additional target configuration when the second additional measurement image is captured. The user adjusts the posture of the workpiece Won the one table so that the boundary of a seventh image area IR7, which is occupied by the workpiece W in the first additional measurement combined image ISA, is substantially parallel to or substantially coincident with the first additional workpiece reference lines RL4 and RL5. The user adjusts the posture of the workpiece W on the one table so that the boundary of an eighth image area IR8, which is occupied by the workpiece W in the second additional measurement combined image ISB, is substantially parallel to or substantially coincident with the second additional workpiece reference lines RL6 and RL7.

The above-described processings of the processor 5 are typically implemented by the processor 5 performing a workpiece installation support program 6p stored in the memory 6 and obtaining images from the camera 4, the first additional camera 4A, and the second additional camera 4B. It is also possible, however, that the processor 5 is implemented in the form of a dedicated image processor or an integrated circuit. A workpiece installation method using the workpiece installation support system 1 will be described below by referring to an example in which the processor 5 performs the workpiece installation support program 6p.

Workpiece Installation Method

Figure 10:
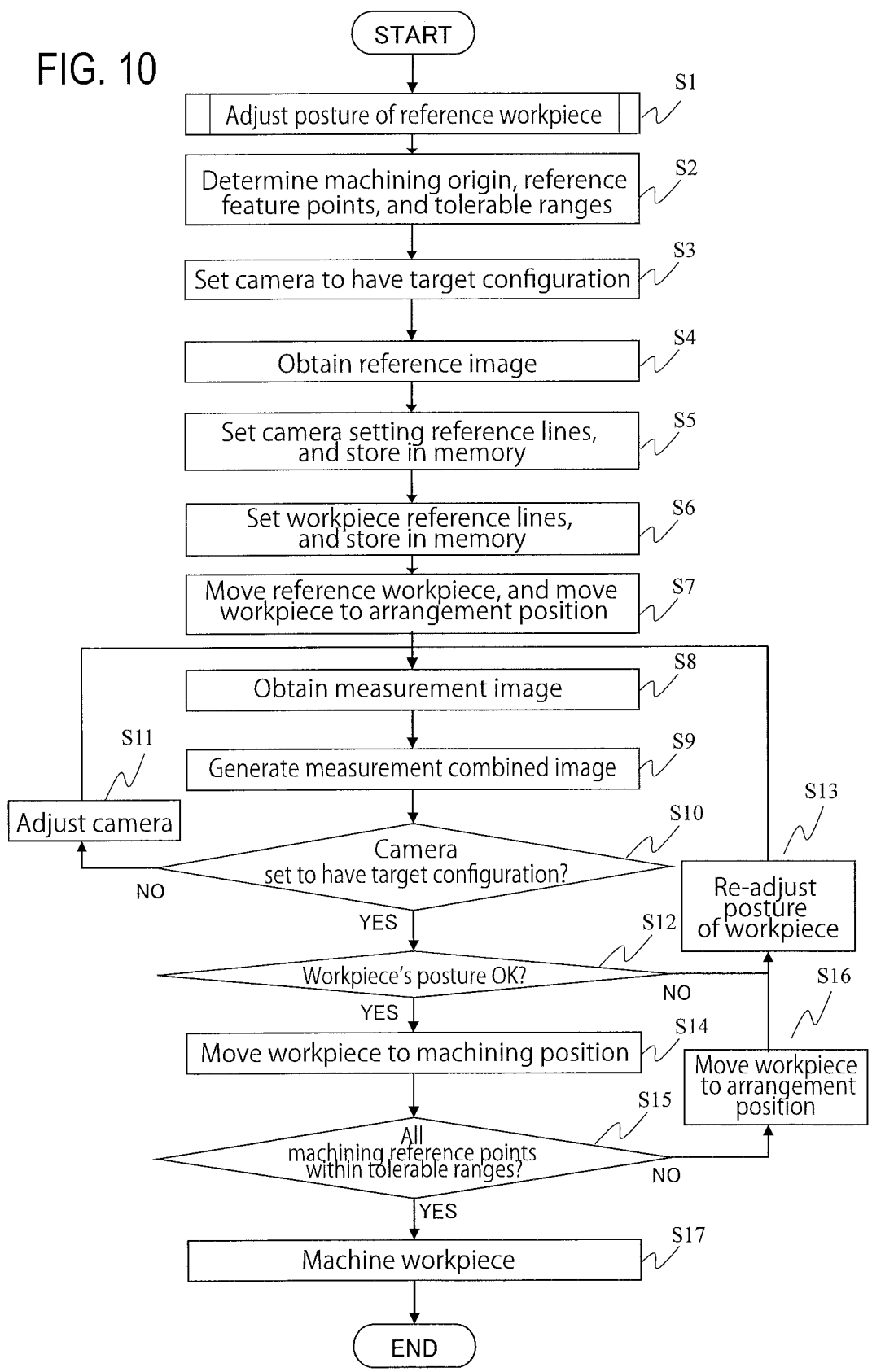
FIG. 10 is a flowchart of a workpiece installation method according to the first embodiment.
Figure 11:
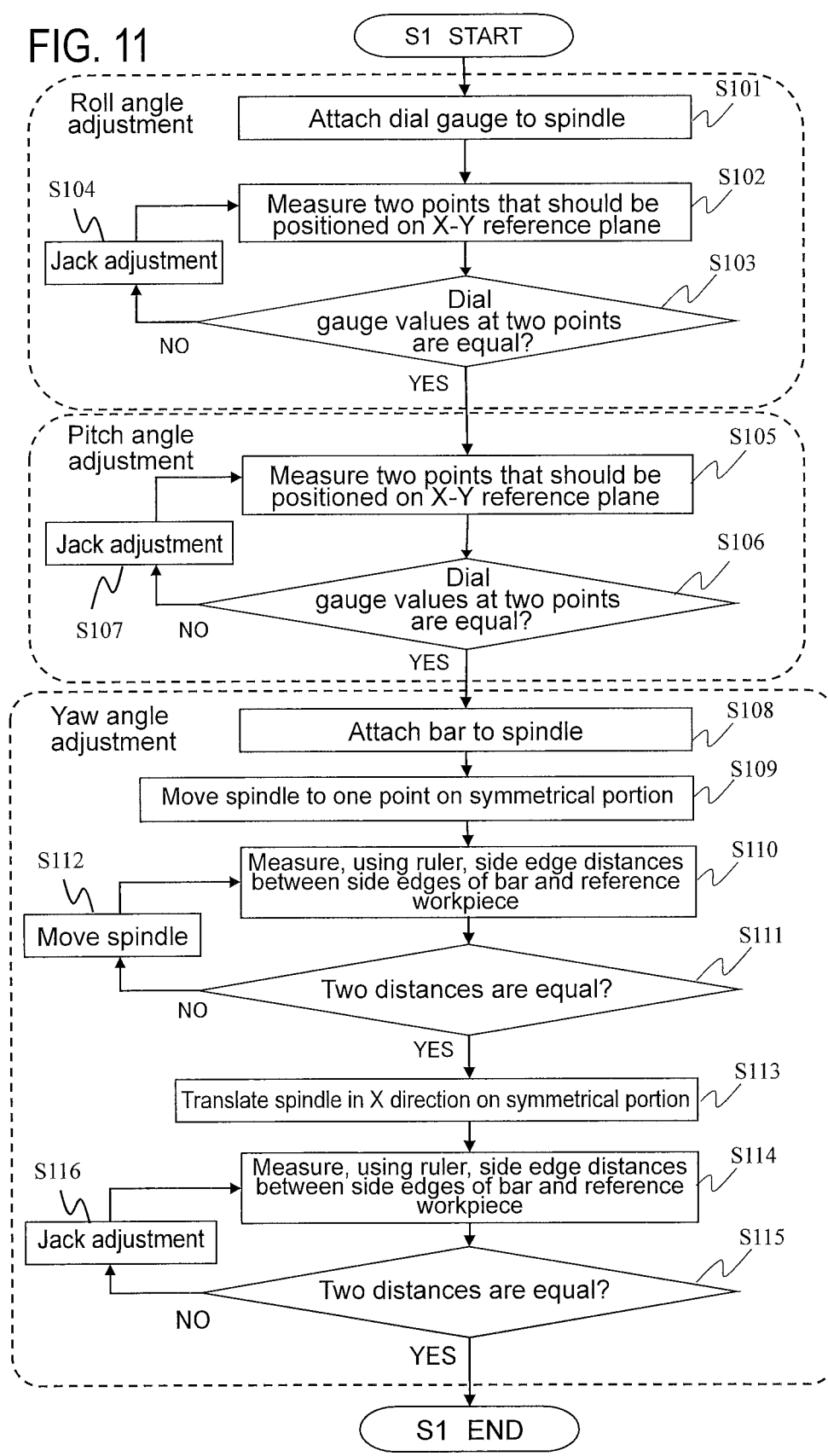
FIG. 11 is a flowchart of a method of adjusting the posture of a reference workpiece to a workpiece reference posture in the first embodiment.
Figure 12:
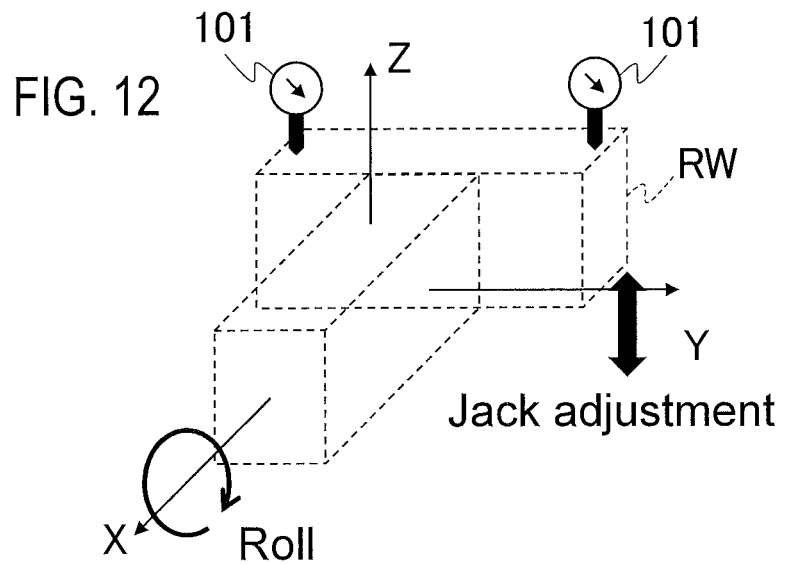
FIG. 12 is an illustration of the reference workpiece posture adjusting method according to the first embodiment.

FIG. 10 is a flowchart of the workpiece installation method according to the first embodiment. At step S1 of this method, the user places the reference workpiece RW on the table 2 and adjusts the posture of the reference workpiece RW on the table 2 so that the posture of the reference workpiece RW is the workpiece reference posture. FIG. 11 is a flowchart of specific processings performed at step S1. First, at step S101, a dial gauge 101 (see FIGS. 12 and 13) is attached to the spindle 9A (see FIG. 1) of the machining apparatus 10. At step S102, as illustrated in FIG. 12, using the dial gauge 101, two points are measured that are spaced apart in the Y direction and that should be, in the machining program, positioned on a plane (X-Y reference plane) parallel to an X-Y plane of the workpiece coordinate system (coordinate system set for the machining apparatus 10 to perform the machining program). The dial gauge 101 indicates values corresponding to Z coordinates of these two points. It is preferable that these two points are spaced as far away from each other as possible in the Y direction. If the dial gauge values at the two points are different from each other (No at step S103), a jack adjustment is performed to make the dial gauge values the same (the processings performed at steps S103→S104→S102 are repeated until Yes is obtained at step S103). By the processings performed at steps S101 to S104, the angle (roll angle) formed by the X-Y plane and the X-Y reference plane translated and made to pass through the origin of the workpiece coordinate system becomes substantially 0 degrees in a view from the X direction.

Figure 13:
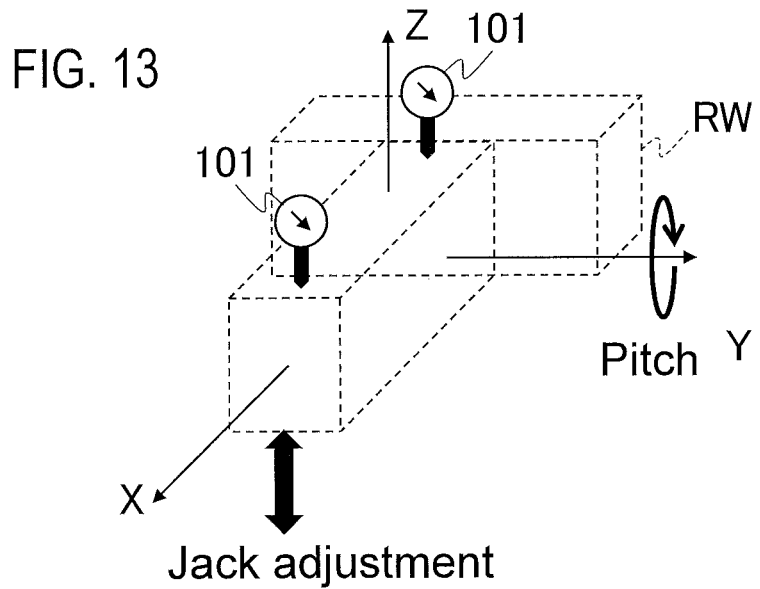
FIG. 13 is an illustration of the reference workpiece posture adjusting method according to the first embodiment.

When the setting of the roll angle is completed (Yes at step S103), step S105 is performed. As illustrated in FIG. 13, using the dial gauge 101, two points are measured that are separated in the X direction and that should be, in the machining program, positioned on a plane (X-Y reference plane) parallel to the X-Y plane of the workpiece coordinate system. The X-Y reference plane at step S105 may be the same as or different from the X-Y reference plane at step S102. It is preferable that these two points are spaced as far away from each other as possible in the X direction. In this case as well, the dial gauge 101 indicates values corresponding to the Z coordinates of these two points. If the dial gauge values at the two points are different from each other (No at step S106), a jack adjustment is performed to make the dial gauge values the same (the processings performed at steps S106→S107→S105 are repeated until Yes is obtained at step S106). By the processings performed at steps S105 and S106, the angle (pitch angle) formed by the X-Y plane and the X-Y reference plane translated and made to pass through the origin of the workpiece coordinate system becomes substantially 0 degrees in a view from the Y direction.

Figure 14:
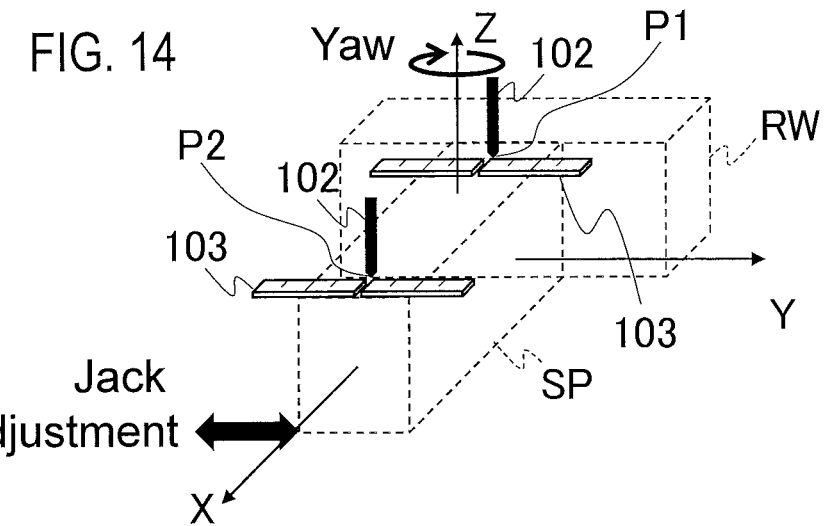
FIG. 14 is an illustration of the reference workpiece posture adjusting method according to the first embodiment.

When the setting of the pitch angle is completed (Yes at step S106), a bar 102 (see FIG. 14) is attached to the spindle 9A (see FIG. 1) of the machining apparatus 10. At step S109, as illustrated in FIG. 14, the spindle 9A is moved to one point on a portion (symmetrical portion SP) of the reference workpiece RW. The portion is a portion that should be, in the machining program, arranged plane-symmetrically with respect to a plane parallel to an X-Z plane of the workpiece coordinate system. The symmetrical portion SP preferably extends in the X direction. Next, at step S110, side edge distances between the side edges of the bar 102 and the side edges of the reference workpiece RW in the Y direction are measured using a ruler 103. If the side edge distances are different from each other (No at step S111), the spindle 9A is moved to make the side edge distances the same (the processings performed at steps S112→S110→S111 are repeated until Yes is obtained at step S111). In FIG. 14, P1 indicates a place where the side edge distances are the same. Upon the side edge distances becoming the same (Yes at step S111), then at step S113, the spindle 9A is translated in the X direction on the symmetrical portion SP from the place P1. At step S114, the side edge distances between the side edges of the bar 102 and the side edges of the reference workpiece RW in the Y direction are measured using the ruler 103. If the two side edge distances are different from each other (No at step S115), a jack adjustment is performed to make the two side edge distances the same (the processings performed at steps S116→S114→S115 are repeated until Yes is obtained at step S115). By the processings performed at steps S108 to S116, the angle (yaw angle) formed by a Z-X plane and a symmetry plane of the symmetrical portion SP becomes substantially 0 degrees in a view from the Z direction. The posture of the reference workpiece RW set in this manner is referred to as workpiece reference posture. Thus, the posture of the reference workpiece RW is defined by a rotation angle (roll angle, pitch angle, and yaw angle) around a coordinate axis of a coordinate system (workpiece coordinate system) set for the machining apparatus 10 to perform the machining program. Since the posture of the workpiece W is also determined based on the workpiece reference posture, the posture of the workpiece W is defined by a rotation angle (roll angle, pitch angle, and yaw angle) around a coordinate axis of a coordinate system (workpiece coordinate system) set for the machining apparatus 10 to perform the machining program.

Figure 15:
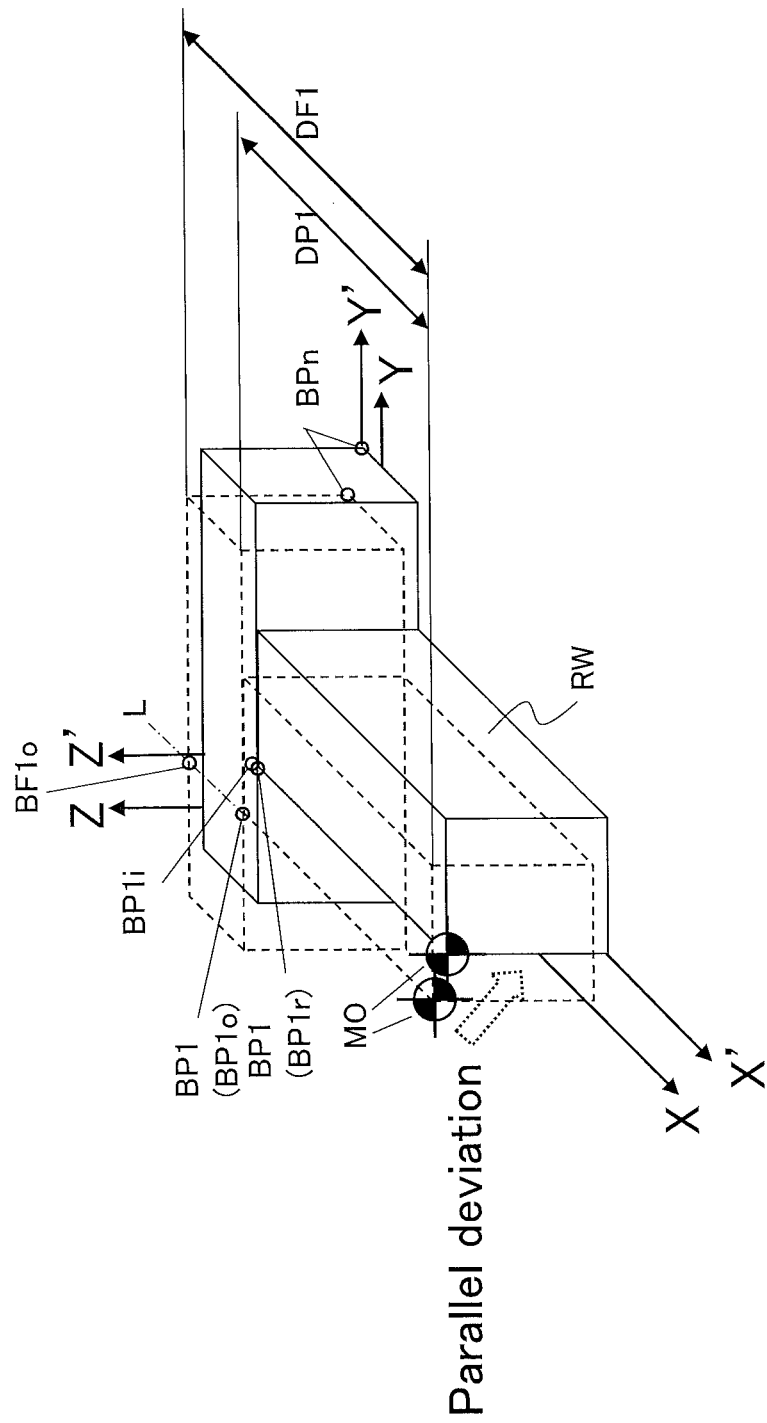
FIG. 15 is an illustration for describing reference feature points and tolerable ranges.

Referring again to FIG. 10, upon adjustment of the posture of the reference workpiece RW to the workpiece reference posture at step S1, step S2 is performed. At step S2, a tolerable range of the machining origin MO in the reference workpiece RW and tolerable ranges of reference feature points BP1 to BPn are set. The reference feature points BP1 to BPn are a plurality of feature points on the shape of the reference workpiece RW. This setting will be described by referring to FIG. 15. For convenience of description, FIG. 15 only illustrates the machining origin MO and the reference feature points BP1 and BPn. In FIG. 15, ideal arrangement positions and ideal arrangement postures of the reference workpiece RW and the workpiece W are indicated by dotted lines. Also in FIG. 15, it is assumed that the reference workpiece RW and the workpiece W indicated by dotted lines have been produced exactly as designed, without a production error. The machining program performed by the machining apparatus 10 includes a command to cut a cutting margin portion of the workpiece occupying the space defined by the dotted lines. Such a model of workpiece managed by the machining program will be referred to as a workpiece model. It is, however, highly laborious to set the reference workpiece RW and the workpiece W to their ideal arrangement positions and ideal arrangement postures. Also, in actual situations, there occurs a production error. Under the circumstances, the machining apparatus 10 operates such that parallel deviations are tolerated. Specifically, one point on each of the reference workpiece RW and the workpiece W that is not to be machined or that is easily usable as a reference (for example, a highest point) is regarded as the machining origin MO. Then, the coordinates of the machining origin MO in the workpiece coordinate system are measured using the position measurement sensor 9. Then, a coordinate conversion with only parallel movement captured into consideration is performed using the difference between the coordinates of the machining origin MO in the workpiece coordinate system and the coordinates of the machining origin MO on the workpiece model. Then, the machining program is performed in the coordinate system obtained by the coordinate conversion, and a machining operation is performed. In FIG. 15, the original workpiece coordinate system is represented by an XYZ coordinate system, and the transformed workpiece coordinate system is represented by an X'Y'Z' coordinate system.

For example, the position of the reference feature point BP1 on the workpiece model is assumed as BPlo ($Xo_1$, $Yo_1$, $Zo_1$). Under this assumption, an ideal is that the reference feature point BP1 should be positioned at BP1$i$, which is represented by (Xo1, Yo1, Zo1) in the X'Y'Z' coordinate system. If, however, the reference workpiece RW and/or the workpiece W have a production error, or if the roll angle, the pitch angle, and/or the yaw angle slightly deviate from 0 degrees, the actual position, BP1$r$, of BP1 deviates from BP1$i$. In light of this situation, machining is determined as performable at the reference feature point BP1 if, for example, the following condition is met. Under the assumption that coordinate values represented in the X'Y'Z' coordinate system of BP1$r$ are (Xr1, Yr1, Zr1), the absolute values of (Xr1−Xo1), (Yr1−Yo1), and (Zr1−Zo1) are smaller than respective thresholds determined based on cutting margins. In other words, if the absolute values of (Xr1−Xo1), (Yr1−Yo1), and (Zr1−Zo1) are smaller than the thresholds, the position of the reference feature point BP1 is regarded as being within a predetermined tolerable range. This manner of determining a tolerable range may be applied to other reference feature points BP2 (not illustrated) to BPn.

It is to be noted, however, that when the reference feature point is a point on a surface farthest from the machining origin MO, such as the reference feature point BPn, the threshold is preferably set to a value smaller than, for example, a half of the cutting margin. However, when there exists a surface farther than the reference feature point BP1 with respect to the machining origin MO, as with the reference feature point BP1, it is preferable to: obtain an intersection point BPlo between a half line L, which passes through BF1$o$ from MO on the workpiece model, and a surface farthest from the machining origin MO; obtain the distance, DP1, from the machining origin MO to BP1$o$; obtain the distance, DF1, from the machining origin MO to BF1$o$; and, based on the distance DP1 and the distance DF1, set the threshold to a value smaller than a value obtained by multiplying half of the cutting margin by D1/DF1. This eliminates or minimizes unmachinability at a surface farthest from the machining origin MO. The threshold may be empirically determined so as to satisfy the above-described condition. It is to be noted that in a case where the cutting margin varies among the X direction (X' direction), the Y direction (Y' direction), and the Z direction (Z' direction), the threshold may be set for each of the X direction (X' direction), the Y direction (Y' direction), and the Z direction (Z' direction).

At step S2, a number of reference feature points BP1 to BPn large enough to determine whether machining is possible are selected. Each of the reference feature points BP1 to BPn is preferably an edge or a corner in that the position of an edge or a corner is easily identified by a contact probe. Also, each of the reference feature points BP1 to BPn is preferably a point as far away from the machining origin MO as possible. When the machining origin MO and the reference feature points BP1 to BPn have been determined, a threshold for each reference feature point is determined in the above-described manner, and a corresponding tolerable range is determined. It is to be noted that the reference workpiece RW which is placed on the table 2 and whose posture has been adjusted to the workpiece reference posture has been adjusted such that the roll angle, the pitch angle, and/or the yaw angle are 0 degrees, leaving as minimal an error as a production error. Therefore, when the table 2 on which the reference workpiece RW whose posture has been adjusted to the workpiece reference posture is placed moves to the machining position MP, all the positions of the reference feature points BP1 to BPn are present within the tolerable range.

At step S3, when the reference image IB is captured, the configuration of the camera 4 is set to the target configuration in which the viewpoint position and the line-of-sight direction of the camera 4 capturing the table 2 are the reference viewpoint position and the reference line-of-sight direction, respectively. Similarly, when the first additional reference image IBA is captured, the configuration of the first additional camera 4A is set to the first additional target configuration in which the viewpoint position and the line-of-sight direction of the first additional camera 4A capturing the table 2 are the first additional reference position different from the reference viewpoint position and the first additional reference line-of-sight direction non-parallel to the reference line-of-sight direction, respectively. Similarly, when the second additional reference image IBB is captured, the configuration of the second additional camera 4B is set to the second additional target configuration in which the viewpoint position of the second additional camera 4B capturing the table 2 is the second additional reference position different from the reference viewpoint position and the first additional reference position and that and the line-of-sight direction of the second additional camera 4B capturing the table 2 is the second additional reference line-of-sight direction non-parallel to the reference line-of-sight direction and the first additional reference line-of-sight direction.

At step S4, the reference image IB that has been captured by the camera 4 whose set to the target configuration and that shows the reference workpiece RW whose posture has been adjusted is obtained. Specifically, the workpiece installation support program 6$p$ causes the processor 5 to perform: processing of obtaining the reference image IB that shows the reference workpiece RW on the table 2 and that has been captured by the camera 4. The configuration of camera 4 is set to the target configuration in which the viewpoint position and the line-of-sight direction of the camera 4 are the reference viewpoint position and the reference line-of-sight direction, respectively. The reference workpiece RW is adjusted so that the posture of the reference workpiece RW is the workpiece reference posture. The first additional reference image IBA is obtained. The first additional reference image IBA shows the reference workpiece RW whose posture has been adjusted, and has been captured by the first additional camera 4A whose configuration has been set to the first additional target configuration. Specifically, the workpiece installation support program 6$p$ causes the processor 5 to perform processing of obtaining the first additional reference image IBA that shows the reference workpiece RW whose posture has been adjusted and that has been captured by the first additional camera 4A. The configuration of first additional camera 4A is set to the first additional target configuration in which the viewpoint position and the line-of-sight direction of the first additional camera 4A are the first additional reference position different from the reference viewpoint position and the first additional reference line-of-sight direction non-parallel to the reference line-of-sight direction, respectively. The second additional reference image IBB is obtained. The second additional reference image IBB shows the reference workpiece RW whose posture has been adjusted, and has been captured by the second additional camera 4B whose configuration has been set to the second additional target configuration. Specifically, the workpiece installation support program 6$p$ causes the processor 5 to perform processing of obtaining the second additional reference image MB that shows the reference workpiece RW whose posture has been adjusted and that has been captured by the second additional camera 4B. The configuration of the second additional camera 4B is set to the second additional target configuration in which the viewpoint position of the second additional camera 4B is the second additional reference position different from the reference viewpoint position and the first additional reference position and the line-of-sight direction of the second additional camera 4B is the second additional reference line-of-sight direction non-parallel to the reference line-of-sight direction and the first additional reference line-of-sight direction.

At step S5, camera setting reference lines CRL1 and CRL2 are set on the boundary of the third image area IR3, which is occupied by the stationary object in the background of the reference image IB. A plurality of positions in the reference image IB that pass through the camera setting reference lines CRL1 and CRL2 are stored in the memory 6 as camera setting reference line positions. Specifically, the workpiece installation support program 6p causes the processor 5 to perform: processing of setting the camera setting reference lines CRL1 and CRL2 on the boundary of the third image area IR3, which is occupied by the stationary object in the background of the reference image 1B; and processing of storing camera setting reference line positions in the memory 6, the camera setting reference line positions being a plurality of positions in the reference image IB that pass through the camera setting reference lines CRL1 and CRL2. More specifically, the workpiece installation support program 6p causes the processor 5 to perform: processing of receiving an input from the input device 7; processing of showing the camera setting reference lines CRL1 and CRL2 to be set by the user such that the camera setting reference lines CRL1 and CRL2 are superimposed on the reference image IB; and processing of, upon receipt of an input of the setting of the shown camera setting reference lines CRL1 and CRL2 from the input device 7, storing camera setting reference line positions in the memory 6, the camera setting reference line positions being a plurality of positions in the reference image IB that pass through the camera setting reference lines CRL1 and CRL2. Alternatively, the workpiece installation support program 6p causes the processor 5 to perform processing of detecting, as the camera setting reference lines CRL1 and CRL2, edges of the boundary of the third image area IR3 obtained by image processing. Then, the workpiece installation support program 6p causes the processor 5 to perform: processing of showing the detected edges such that the edges are superimposed on the reference image IB; and processing of, upon receipt of an input of selection of the edges from the input device 7, storing camera setting reference line positions in the memory 6, the camera setting reference line positions being a plurality of positions in the reference image IB that pass through the camera setting reference lines CRL1 and CRL2 respectively associated with the edges.

Similarly, the first additional camera setting reference lines CRL3 and CRL4 are set on the boundary of the image area BG1, which is occupied by the stationary object in the background of the first additional reference image IBA. First additional camera setting reference line positions are stored in the memory 6. The first additional camera setting reference line positions are a plurality of positions in the first additional reference image IBA that pass through the first additional camera setting reference lines CRL3 and CRL4. The second additional camera setting reference lines CRL5 and CRL6 are set on the boundary of the image area BG2, which is occupied by the stationary object in the background of the second additional reference image IBB. Second additional camera setting reference line positions are stored in the memory 6. The second additional camera setting reference line positions are a plurality of positions in the second additional reference image IBB that pass through the second additional camera setting reference lines CRL5 and CRL6. In these cases as well, the workpiece installation support program 6p causes the processor 5 to perform processings similar to the processings performed by the workpiece installation support program 6p, namely, the processing of setting the camera setting reference lines CRL1 and CRL2 and the processing of storing the camera setting reference lines CRL1 and CRL2 in the memory 6.

At step S6, workpiece reference lines RL1 to RL3 are set on the boundary of the first image area IR1, which is occupied by the reference workpiece RW in the reference image TB. Workpiece reference line positions are stored in the memory 6. The workpiece reference line positions are a plurality of positions in the reference image IB that pass through the workpiece reference lines RL1 to RL3. Specifically, the workpiece installation support program 6p causes the processor 5 to perform: processing of setting workpiece reference lines IR1 to RL3 on the boundary of the first image area RL1, which is occupied by the reference workpiece RW in the reference image IB; and processing of storing workpiece reference line positions in the memory 6, the workpiece reference line positions being a plurality of positions in the reference image IB that pass through the workpiece reference lines RL1 to RL3. More specifically, the workpiece installation support program 6p causes the processor 5 to perform: processing of receiving an input from the input device 7; processing of showing the workpiece reference lines RL1 to RL3 to be set by the user such that the workpiece reference lines RL1 to RL3 are superimposed on the reference image IB; and processing of, upon receipt of an input of the setting of the shown workpiece reference lines RL1 to RL3 from the input device 7, storing workpiece reference line positions in the memory 6, the workpiece reference line positions being a plurality of positions in the reference image IB that pass through the workpiece reference lines RL1 to RL3 Alternatively, the workpiece installation support program 6p causes the processor 5 to perform processing of detecting, as the workpiece reference lines RL1 to RL3, edges of the boundary of the first image area IR1 obtained by image processing. Then, the workpiece installation support program 6p causes the processor 5 to perform: processing of showing the detected edges such that the edges are superimposed on the reference image IB; and processing of, upon receipt of an input of selection of the edges from the input device 7, storing workpiece reference line positions in the memory 6, the workpiece reference line positions being a plurality of positions in the reference image IB that pass through the workpiece reference lines RL1 to RL3 respectively associated with the edges.

Similarly, a plurality of first additional workpiece reference lines RL4 and RL5 are set on the boundary of the fifth image area IR5, which is occupied by the reference workpiece RW in the first additional reference image IBA. First additional workpiece reference line positions are stored in the memory 6. The first additional workpiece reference line positions are a plurality of positions in the first additional reference image IBA that pass through the first additional workpiece reference lines RL4 and RL5. Specifically, the workpiece installation support program 6p causes the processor 5 to perform: processing of setting first additional workpiece reference lines RL4 and RL5 on the boundary of the fifth image area IR5, which is occupied by the reference workpiece RW in the first additional reference image IBA; and processing of storing first additional workpiece reference line positions in the memory 6, the first additional workpiece reference line positions being a plurality of positions in the first additional reference image IBA that pass through the first additional workpiece reference lines RL4 and RL5. Second additional workpiece reference lines RL6 and RL7 are set on the boundary of the sixth image area IR6, which is occupied by the reference workpiece RW in the second additional reference image IBB. Second additional workpiece reference line positions are stored in the memory 6. The second additional workpiece reference line positions are a plurality of positions in the second additional reference image IBB that pass through the second additional workpiece reference lines RL6 and RL7. The processor 5 is also caused to perform: processing of setting second additional workpiece reference lines RL6 and RL7 on the boundary of the sixth image area IR6, which is occupied by the reference workpiece RW in the second additional reference image IBB; and processing of storing second additional workpiece reference line positions in the memory 6, the second additional workpiece reference line positions being a plurality of positions in the second additional reference image IBB that pass through the second additional workpiece reference lines RL6 and RL7. In these cases as well, the workpiece installation support program 6p causes the processor 5 to perform processings similar to the processings performed by the workpiece installation support program 6p, namely, the processing of setting the workpiece reference lines RL1 to RL3 and the processing of storing the workpiece reference lines RL1 to RL3 in the memory 6.

At step S7, the workpiece W substantially identical in shape and size to the reference workpiece RW is placed on one table out of: the table 2 from which the reference workpiece RW is removed; and the additional table 2A, which is different from the table 2 and which has been placed in place of the table 2. A typical example is that the table 2 on which the reference workpiece RW is placed is moved to the machining position MP, and while the reference workpiece RW is being machined, the additional table 2A on which the workpiece W is placed is moved to the arrangement position AP. Alternatively, the table 2 on which the reference workpiece RW is placed is moved to the machining position MP, the reference workpiece RW is machined, the machined reference workpiece RW is removed from the table 2, and then the table 2 on which the workpiece W is placed is moved to the arrangement position AP.

At step S8, a measurement image that shows the workpiece W and that has been captured by the camera 4 whose configuration has been set to the target configuration is obtained. Specifically, the workpiece installation support program 6p causes the processor 5 to perform processing of obtaining a measurement image that shows a workpiece W and that has been captured by the camera 4 whose configuration has been set to the target configuration. The workpiece W is substantially identical in shape and size to the reference workpiece RW, and is placed on one table out of the table 2 from which the reference workpiece RW is removed and the additional table 2A different from the table 2. Further, a first additional measurement image is obtained. The first additional measurement image shows the workpiece W and has been captured by the first additional camera 4A whose configuration has been set to the first additional target configuration. Specifically, the workpiece installation support program 6p causes the processor 5 to perform processing of obtaining the first additional measurement image that shows the workpiece W and that has been captured by the first additional camera 4A whose configuration has been set to the first additional target configuration. A second additional measurement image is obtained. The second additional measurement image shows the workpiece W and has been captured by the second additional camera 4B whose configuration has been set to the second additional target configuration. Specifically, the workpiece installation support program 6p causes the processor 5 to perform: processing of obtaining a second additional measurement image that shows the workpiece W and that has been captured by the second additional camera 4B whose configuration has been set to the second additional target configuration.

At step S9, the workpiece installation support program 6p causes the processor 5 to perform: processing of generating the measurement combined image IS in which the plurality of workpiece reference lines RL1 to RL3 are superimposed on the measurement image and which shows the workpiece reference lines L1 to RL3 pass through positions respectively identical to the workpiece reference line positions. The workpiece installation support program 6p also causes the processor 5 to perform processing of: generating the measurement combined image IS in which the camera setting reference lines CRL1 and CRL2 are superimposed on the measurement image and which shows the camera setting reference lines CRL1 and CRL2 pass through positions respectively identical to the camera setting reference line positions. The workpiece installation support program 6p causes the processor 5 to perform processing of displaying the measurement combined image IS on the display 8. In this manner, the processor 5 generates the measurement combined image IS in which the workpiece reference lines RL1 to RL3 are superimposed on the measurement image and which shows the workpiece reference lines RL1 to RL3 pass through positions respectively identical to the workpiece reference line positions. The processor 5 also generates the measurement combined image IS in which the camera setting reference lines CRL1 and CRL2 are superimposed on the measurement image and which shows the camera setting reference lines CRL1 and CRL2 pass through positions respectively identical to the camera setting reference line positions. The display 8 displays the measurement combined image IS.

Similarly, the workpiece installation support program 6p causes the processor 5 to perform processing of generating the first additional measurement combined image ISA in which the first additional workpiece reference lines RL4 and RL5 are superimposed on the first additional measurement image and which shows the first additional workpiece reference lines RL4 and RL5 pass through positions respectively identical to the first additional workpiece reference line positions. The workpiece installation support program 6p also causes the processor 5 to perform processing of generating the first additional measurement combined image ISA in which the first additional camera setting reference lines CRL3 and CRL4 are superimposed on the first additional measurement image and which shows the first additional camera setting reference lines CRL3 and CRL4 pass through positions respectively identical to the first additional camera setting reference line positions. The workpiece installation support program 6p causes the processor 5 to perform processing of displaying the first additional measurement combined image ISA on the display 8. In this manner, the processor 5 generates the first additional measurement combined image ISA in which the first additional workpiece reference lines RL4 and RL5 are superimposed on the first additional measurement image and which shows the first additional workpiece reference lines RL4 and RL5 pass through positions respectively identical to the first additional workpiece reference line positions. The processor 5 also generates the first additional measurement combined image ISA in which the first additional camera setting reference lines CRL3 and CRL4 are superimposed on the first additional measurement image and which shows the first additional camera setting reference lines CRL3 and CRL4 pass through positions respectively identical to the first additional camera setting reference line positions. The display 8 displays the first additional measurement combined image ISA.

The workpiece installation support program 6p also causes the processor 5 to perform: processing of generating the second additional measurement combined image ISB in which the second additional workpiece reference lines RL6 and RL7 are superimposed on the second additional measurement image and which shows the second additional workpiece reference lines RL6 and RL7 pass through positions respectively identical to the second additional workpiece reference line positions. The workpiece installation support program 6p also causes the processor 5 to perform processing of generating the second additional measurement combined image ISB in which the second additional camera setting reference lines CRL5 and CRL6 are superimposed on the second additional measurement image and which shows the second additional camera setting reference lines CRL5 and CRL6 pass through positions respectively identical to the second additional camera setting reference line positions. The workpiece installation support program 6p causes the processor 5 to perform processing of displaying the second additional measurement combined image ISB on the display 8. In this manner, the processor 5 generates the second additional measurement combined image ISB in which the second additional workpiece reference lines RL6 and RL7 are superimposed on the second additional measurement image and which shows the second additional workpiece reference lines RL6 and RL7 pass through positions respectively identical to the second additional workpiece reference line positions. The processor 5 generates the second additional measurement combined image ISB in which the second additional camera setting reference lines CRL5 and CRL6 are superimposed on the second additional measurement image and which shows the second additional camera setting reference lines CRL5 and CRL6 pass through positions respectively identical to the second additional camera setting reference line positions. The display 8 displays the second additional measurement combined image ISB.

At step S10, the user checks whether the configuration of the camera 4 is set to the target configuration based on whether the boundary of the fourth image area IS4, which is occupied by the stationary object in the measurement combined image IS displayed on the display 8, overlaps with the camera setting reference lines CRL1 and CRL2. The user checks whether the configuration of the first additional camera 4A is set to the first additional target configuration based on whether the boundary of the image area BG3, which is occupied by the stationary object in the first additional measurement combined image ISA displayed on the display 8, overlaps with the first additional camera setting reference lines CRL3 and CRL4. The user checks whether the configuration of the second additional camera 4B is set to the second additional target configuration based on whether the boundary of the image area BG4, which is occupied by the stationary object in the second additional measurement combined image ISB displayed on the display 8, overlaps with the second additional camera setting reference lines CRL5 and CRL6. When the configuration of the camera 4 is not set to the target configuration (No at step S10), then at step S11, the user adjusts the viewpoint position and the line-of-sight direction of the camera 4 so that the boundary of the fourth image area IS4, which is occupied by the stationary object in the measurement combined image IS, overlaps with the camera setting reference lines CRL1 and CRL2. By repeating the processings performed at steps S8 to S11, the configuration of the camera 4 is set to the target configuration. Similarly, when the configuration of the first additional camera 4A is not set to the first additional target configuration (No at step S10), then at step S11, the user adjusts the viewpoint position and the line-of-sight direction of the first additional camera 4A so that the boundary of the image area BG3, which is occupied by the stationary object in the first additional measurement combined image ISA, overlaps with the first additional camera setting reference lines CRL3 and CRL4. By repeating the processings performed at steps S8 to S11, the configuration of the first additional camera 4A is set to the first additional target configuration. When the configuration of the second additional camera 4B is not set to the second additional target configuration (No at step S10), then at step S11, the user adjusts the viewpoint position and the line-of-sight direction of the second additional camera 4B so that the boundary of the image area BG4, which is occupied by the stationary object in the second additional measurement combined image ISB, overlaps with the second additional camera setting reference lines CRL5 and CRL6. By repeating the processings performed at steps S8 to S11, the configuration of the second additional camera 4B is set to the second additional target configuration.

When the configuration of the camera 4 is set to the target configuration, the configuration of the first additional camera 4A is set to the first additional target configuration, and the configuration of the second additional camera 4B is set to the second additional target configuration (Yes at step S10), then at step S12, the user checks whether the boundary of the second image area IR2, which is occupied by the workpiece W in the measurement combined image IS, is substantially parallel to or substantially coincident with the workpiece reference lines RL1 to RL3. When the boundary of the second image area IR2 and the workpiece reference lines RL1 to RL3 are not coincident with each other and are not parallel to each other (No at step S12), then at step S13, the user adjusts the posture of the workpiece W on the one table so that the boundary of the second image area IR2, which is occupied by the workpiece W in the measurement combined image IS, is substantially parallel to or substantially coincident with the workpiece reference lines RL1 to RL3. By repeating the processings performed at steps S8 to S10 and steps S12 and S13, the boundary of the second image area IR2, which is occupied by the workpiece W in the measurement combined image IS, is substantially parallel to or substantially coincident with the workpiece reference lines RL1 to RL3. Similarly, at step S12, the user checks whether the boundary of the seventh image area IR7, which is occupied by the workpiece W in the first additional measurement combined image ISA, is substantially parallel to or substantially coincident with the first additional workpiece reference lines RL4 and RL5. When the boundary of the seventh image area IR7 and the first additional workpiece reference lines RL4 and RL5 are not coincident with each other and are not parallel to each other (No at step S12), then at step S13, the user adjusts the posture of the workpiece Won the one table such that the boundary of the seventh image area IR7, which is occupied by the workpiece W in the first additional measurement combined image ISA, is substantially parallel to or substantially coincident with the first additional workpiece reference lines RL4 and RL5. By repeating the processings performed at steps S8 to S10 and steps S12 and S13, the boundary of the seventh image area IR7, which is occupied by the workpiece W in the first additional measurement combined image ISA, is substantially parallel to or substantially coincident with the first additional workpiece reference lines RL4 and RL5. Further, at step S12, the user checks whether the boundary of the eighth image area IR8, which is occupied by the workpiece W in the second additional measurement combined image ISB, is substantially parallel to or substantially coincident with the second additional workpiece reference lines RL6 and RL7. When the boundary of the eighth image area IR8 and the second additional workpiece reference lines RL6 and RL7 are not coincident with each other and are not parallel to each other (No at step S12), then at step S13, the user adjusts the posture of the workpiece W on the one table so that the boundary of the eighth image area IR8, which is occupied by the workpiece W in the second additional measurement combined image ISB, is substantially parallel to or substantially coincident with the second additional workpiece reference lines RL6 and RL7. By repeating the processings performed at steps S8 to S10 and steps S12 and S13, the boundary of the eighth image area IR8, which is occupied by the workpiece W in the second additional measurement combined image ISB, is substantially parallel to or substantially coincident with the second additional workpiece reference lines RL6 and RL7.

Figure 16:
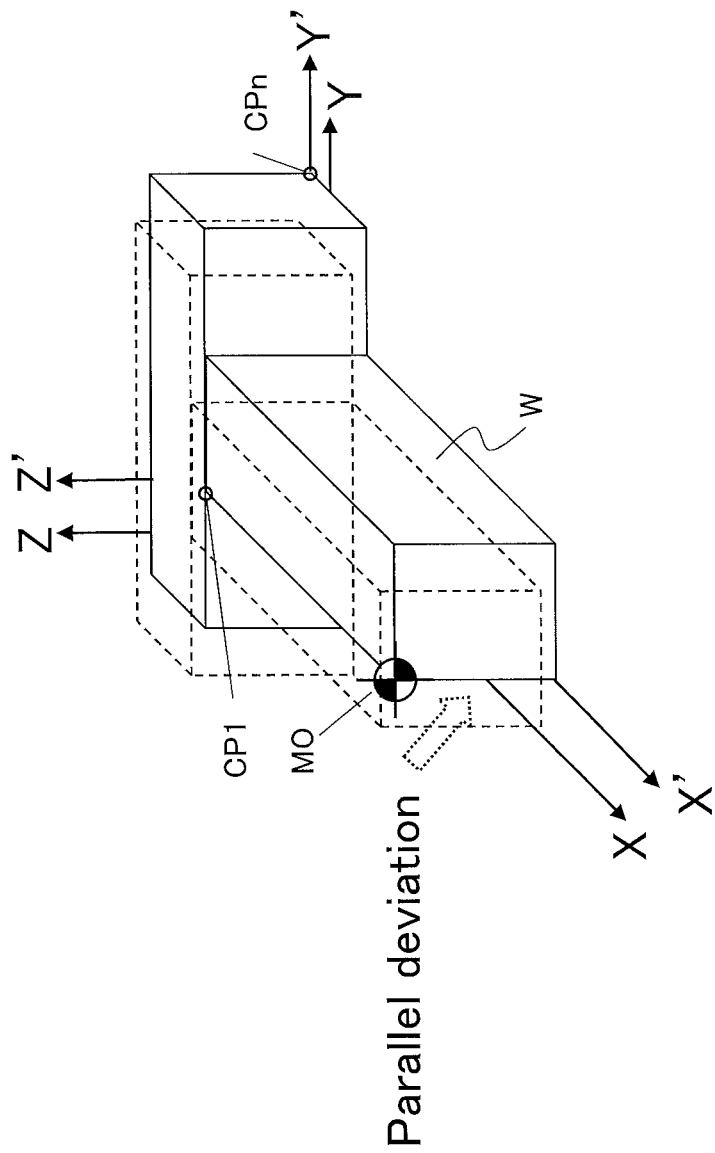
FIG. 16 is an illustration for describing machining reference points.

When the adjustment of the posture of the workpiece W is completed (Yes at step S12), then at step S14, the one table on which the workpiece W whose posture has been adjusted is placed moves to the machining position MP. At step S15, the position measurement sensor 9 of the machining apparatus 10 measures the positions of machining reference points CP1 to CPn. The machining reference points CP1 to CPn are feature points on a shape substantially identical to the shape of the workpiece W, the feature points respectively corresponding to the reference feature points BP1 to BPn. FIG. 16 is an illustration of the machining reference points CP1 to CPn. As illustrated in FIGS. 15 and 16, the machining reference points CP1 to CPn respectively correspond to the reference feature points BP1 to BPn. The machining reference points CP1 to CPn are edges or corners whose positions are easily identified by the contact probe. Under the condition that there is no significant positional deviation, the position measurement sensor 9 is able to automatically search for the positions of the machining reference points CP1 to CPn. Then, the numerical controller 100 (electronic circuit 110) determines whether the positions of the machining reference points CP1 to CPn are each within the tolerable range. This determination is similar to the determination as to whether the reference feature points BP1 to BPn are each within the tolerable range.

When the determination made by the electronic circuit 110 is that all the positions of the machining reference points CP1 to CPn are within the respective tolerable ranges (Yes at step S15), then at step S17, the machining apparatus 10 outputs a determination result indicating that machining is permitted (a determination allowing the machining), and machines the workpiece W. When the determination is that at least one position of the machining reference points CP1 to CPn is not within the tolerable range (No at step S15), then at step S16, the machining apparatus 10 outputs a determination result indicating that machining is not permitted, and the one table on which the workpiece W moved to the machining position MP is placed moves to the arrangement position AP or does not return to the arrangement position and is readjusted at the machining position.

Modification of First Embodiment

In the above-described methods, it is necessary for the user to visually recognize the measurement combined image IS when the user adjusts the posture of the workpiece W such that the boundary of the second image area IR2, which is occupied by the workpiece W in the measurement combined image IS, is substantially parallel to or substantially coincident with the workpiece reference lines RL1 to RL3. Thus, it is difficult to accurately adjust the posture of the workpiece W. In particular, it is not easy to accurately determine whether the boundary of the second image area IR2 is substantially parallel to the workpiece reference lines RL1 to RL3. Under the circumstances, this determination may be performed by machine learning.

Figure 17:
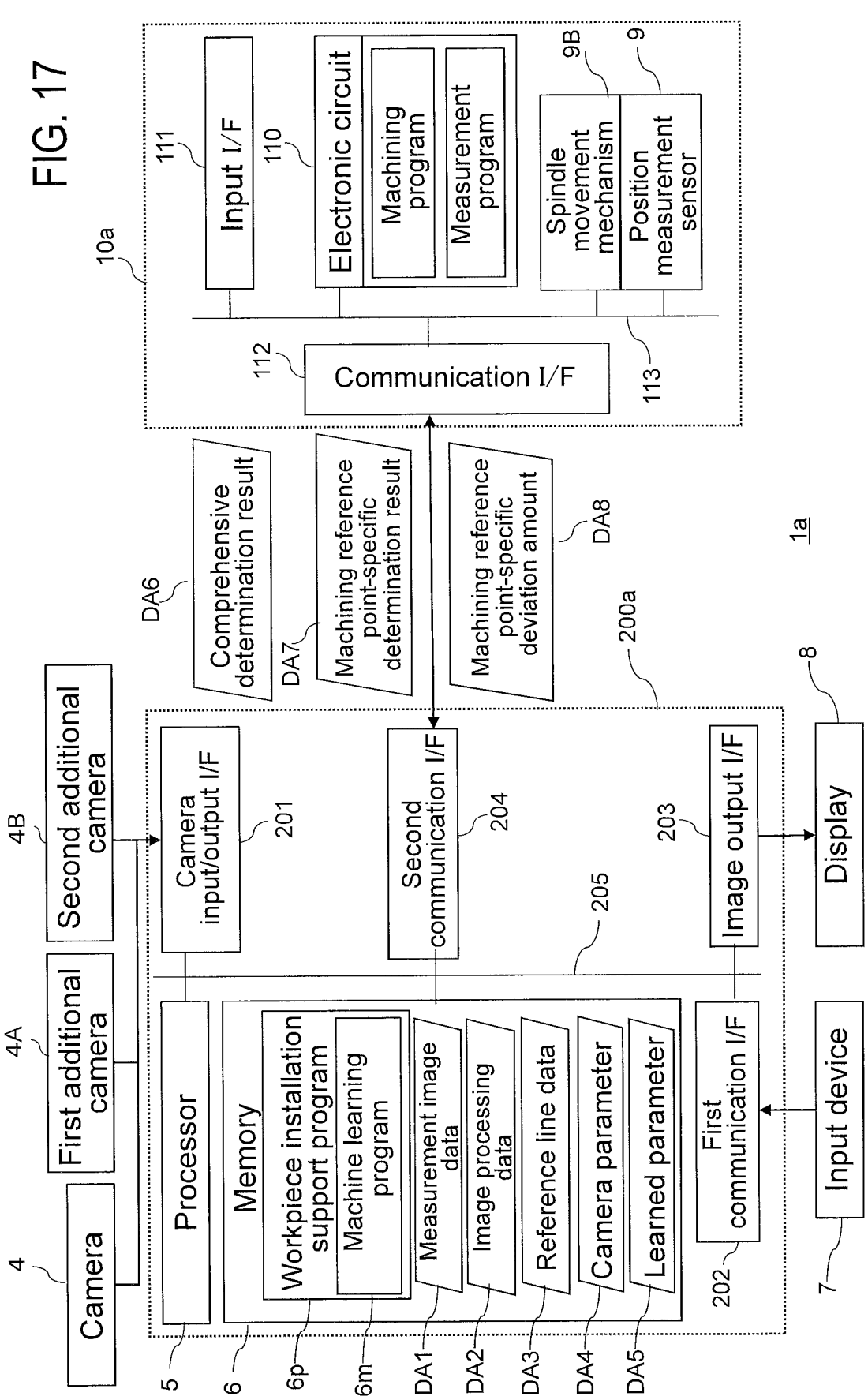
FIG. 17 is a block diagram of a workpiece installation support system according to a modification of the first embodiment.

FIG. 17 is a block diagram of a workpiece installation support system 1a according to a modification of the first embodiment. In the present modification, the workpiece installation support program 6p includes a machine learning program 6m, and the memory 6 further stores measurement image data DA1, image processing data DA2, reference line data DA3, a camera parameter DA4, and a learned parameter DA5. These data and parameters are used for the machine learning program 6m. An image processing device 200a includes a second communication interface 204, and a machining apparatus 10a includes a communication interface 112. The second communication interface 204 and communication interface 112 are communicable with each other. The second communication interface 204 and the communication interface 112 may be any interfaces insofar as the second communication interface 204 and the communication interface 112 are communicable with each other. Examples include an Ethernet® interface and a wireless communication interface. The machining apparatus 10a may transmit the following to the image processing device 200a via the second communication interface 204 and the communication interface 112: a determination result (comprehensive determination result DA6) of the determination as to whether all the positions of the machining reference points CP1 to CPn are within the respective tolerable ranges; a determination result (machining reference point-specific determination result DA7) of the determination as to whether each of the machining reference points CP1 to CPn is within the tolerable range; and a deviation amount (machining reference point-specific determination result DA7) indicating the amount of deviation of each of the machining reference points CP1 to CPn from the center value of the tolerable range. The memory 6 may further store the comprehensive determination result DA6, the machining reference point-specific determination result DA7, and a machining reference point-specific deviation amount DA5. The machine learning program 6m, the measurement image data DA1, the image processing data DA2, the reference line data DA3, the camera parameter DA4, the learned parameter DA5, the comprehensive determination result DA6, the machining reference point-specific determination result DA7, and the machining reference point-specific deviation amount DA8 may be stored in an external server such as a cloud service, instead of the image processing device so that the machine learning program 6m is performed in the external server and only an execution result is returned to the image processing device 200a.

The measurement image data DA1 is at least one of the measurement image captured by the camera 4, the first additional measurement image captured by the first additional camera 4A, and the second additional measurement image captured by the second additional camera 4B. The image processing data DA2 is at least one of: a binary image obtained by performing edge detection processing on each of the measurement image, the first additional measurement image, and the second additional measurement image; and a binary image obtained by detecting the workpiece W by, for example, background difference. The reference line datum DA3 is at least one datum of the workpiece reference line positions of the workpiece reference lines RL1 to RL3, the first additional workpiece reference line positions of the first additional workpiece reference lines RL4 and RL5, and the second additional workpiece reference line positions of the second additional workpiece reference lines RL6 and RL7. The camera parameter DA4 includes: image center positions and distortion aberration parameters of the measurement image, the first additional measurement image, and the second additional measurement image; and focal lengths of the camera 4, the first additional camera 4A, and the second additional camera 4B. The comprehensive determination result DA6 is the determination result obtained at step S15. The machining reference point-specific determination result DA7 is a result of the determination as to whether the absolute value of the difference between the positions measured by the position measurement sensor 9 and the ideal position of each of the machining reference points CP1 to CPn obtained from the workpiece model at each of the machining reference points CP1 to CPn is equal to or less than the threshold. The machining reference point-specific deviation amount DA8 is a value of the difference between the position measured by the position measurement sensor 9 and the ideal position of each of the machining reference points CP1 to CPn obtained from the workpiece model at each of the machining reference points CP1 to CPn.

The machine learning program 6m causes the processor 5 to perform processing of learning a machine learning model using a learning model and teaching data. The learning model is a neural network, more preferably, a neural network having three or more layers used for deep learning. The teaching data has, as an input, the measurement image data DA1 and the reference line data DA3, and has, as an output, at least one data among the comprehensive determination result DA6, the machining reference point-specific determination result DA7, and the machining reference point-specific deviation amount DA8. At least one of the image processing DA2 and the camera parameter DA4 may be further input to learn the machine learning model. The learned parameter DA5 stores a weight parameter of a weight between neurons in each layer of the neural network learned in the above manner. Thus, the workpiece installation support program 6p uses a machine learning model that has learned using teaching data that has: as an input, the measurement image and the workpiece reference lines RL1 to RL3; and as an output, at least one of: the result of the determination as to whether all the positions of the machining reference points CP1 to CPn are within the respective tolerable ranges; the result of the determination as to whether each of the machining reference points CP1 to CPn is within the corresponding tolerable range; and the machining reference points CP1 to CPn and the center values of the respective tolerable ranges (amounts of deviation from the ideal positions of the machining reference points CP1 to CPn obtained from the workpiece model). That is, the workpiece installation support program 6p uses a machine learning model that has learned using teaching data that has: as an input, the measurement image and the workpiece reference lines RL1 to RL3; and as an output, at least one of: the result of the determination as to whether all the positions of the machining reference points CP1 to CPn are within the respective tolerable ranges; the result of the determination as to whether each of the machining reference points CP1 to CPn is within the corresponding tolerable range; and the machining reference points CP1 to CPn and the center values of the respective tolerable ranges (amounts of deviation from the ideal positions of the machining reference points CP1 to CPn obtained from the workpiece model). The workpiece installation support program 6p uses a machine learning model that has learned using teaching data that has: as an input, the measurement image and the workpiece reference lines RL1 to RL3; and as an output, at least one of: the result of the determination; the result of the determination as to whether each of the machining reference points CP1 to CPn is within the corresponding tolerable range; and the amount of deviation of each of the machining reference points CP1 to CPn from the center value of the corresponding tolerable range. The machine learning model has learned using the teaching data such that the input data additionally comprises at least one of: an edge detected from the measurement image; the amount of deviation of each of the workpiece reference line positions from the center of the image; the focal length of the lens of the camera; and a distortion parameter of the camera.

Figure 18:
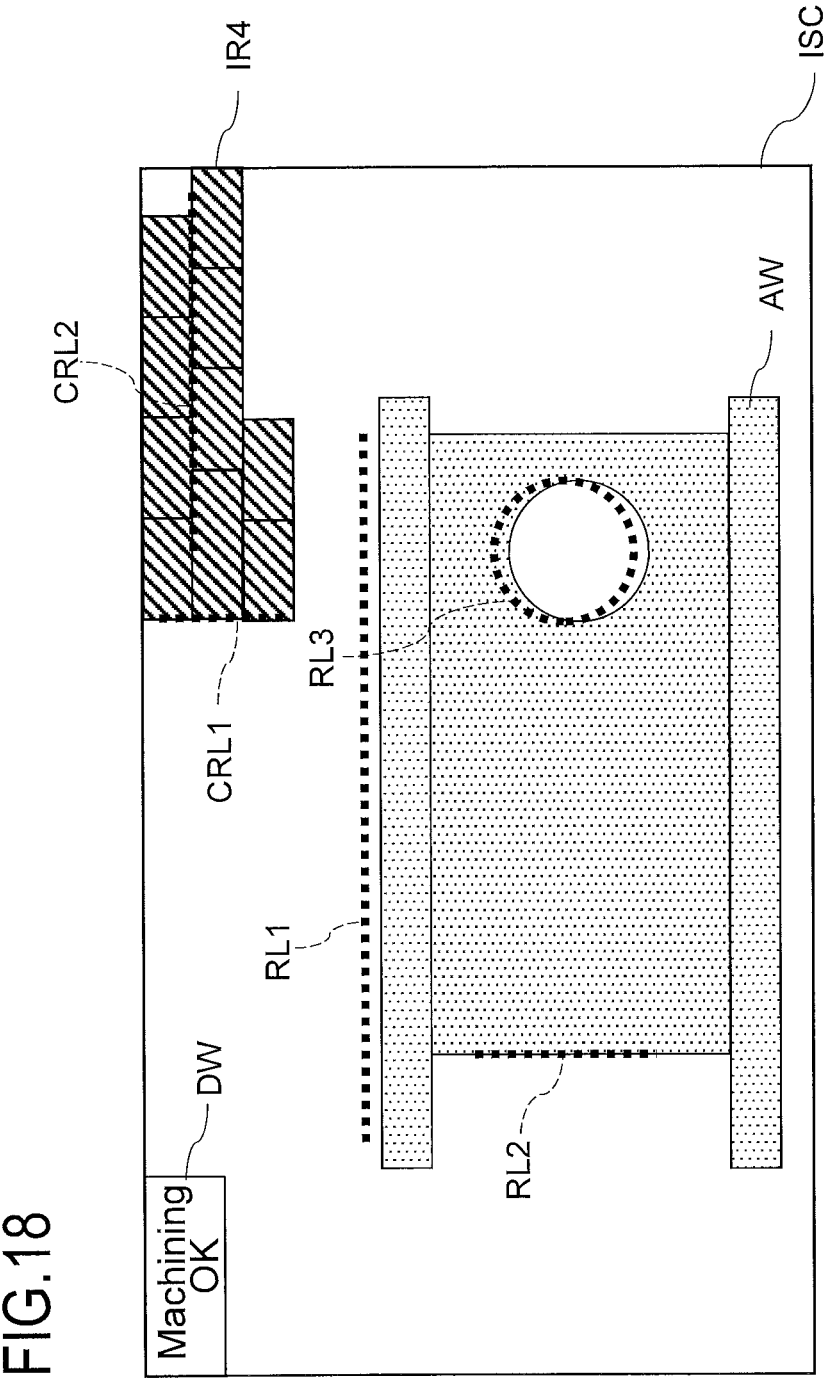
FIG. 18 is an illustration of an example third additional measurement image showing a determination result.

The machine learning program 6m further causes the processor 5 to perform processing of determining whether, when the one table on which the first additional workpiece AW is placed is moved to the machining position, all the positions of first additional machining reference points are within the respective tolerable ranges. The first additional machining reference points are feature points on a shape substantially identical to the shape of the first additional workpiece AW, the feature points respectively corresponding to the reference feature points BP1 to BPn. Here, the learned learning model that has learned in the above-described manner is used. The learned learning model has, as an input, the reference line data DA3 and at least one of an image captured by the camera 4 (third additional measurement image), an image captured by the first additional camera 4A (fifth additional measurement image), and an image captured by the second additional camera 4B (sixth additional measurement image). The images captured by these cameras are images of the first additional workpiece AW, which is substantially identical in shape and size to the reference workpiece RW. At least one of the following may further be input to the machine learning program 6m: a binary image obtained by performing edge detection processing on each of the third additional measurement image, the fifth additional measurement image, and the sixth additional measurement image; a binary image on which the first additional workpiece AW has been detected by background difference; and the camera parameter DA4. FIG. 18 illustrates an example of a combined image ISC, which shows a determination result associated with the third additional measurement image. In the combined image ISC, the workpiece reference lines RL1 to RL3, the camera setting reference lines CRL1 to CRL2, and a determination result display window DW are superimposed on the third additional measurement image. With this configuration, the workpiece installation support program 6p causes the processor 5 to perform processing of determining based on the third additional measurement Image that shows the first additional Workpiece AW, which is substantially identical in shape and size to the reference workpiece RW, and that has been captured by the camera 4 whose configuration has been set to the target configuration. The determination is as to whether, when the one table on which the first additional workpiece is placed is moved to the machining position, all the positions of the first additional machining reference points are within the respective tolerable ranges. The first additional machining reference points are feature points on a shape substantially identical to the shape of the first additional workpiece AW, the feature points respectively corresponding to the reference feature points BP1 to BPn. Thus, the processor 5 makes the determination based on the third additional measurement image that shows the first additional workpiece AW, which is substantially identical in shape and size to the reference workpiece RW, and that has been captured by the camera 4 whose configuration has been set to the target configuration. The determination is as to whether, when the one table on which the first additional workpiece is placed is moved to the machining position, all the positions of the first additional machining reference points are within the respective tolerable ranges. The first additional machining reference points are feature points on a shape substantially identical to the first additional workpiece AW, the feature points respectively corresponding to the reference feature points BP1 to BPn. Thus, the workpiece installation method makes the determination based on the third additional measurement image that shows the first additional workpiece AW, which is substantially identical in shape and size to the reference workpiece RW, and that has been captured by the camera 4 whose configuration has been set to the target configuration. The determination is as to whether, when the one table on which the first additional workpiece is placed is moved to the machining position, all the positions of the first additional machining reference points are within the respective tolerable ranges. The first additional machining reference points are feature points on a shape substantially identical to the shape the first additional workpiece AW, the feature points respectively corresponding to the reference feature points BP1 to BPn. In this case, the machine learning program 6m may be performed at the above-described step S12.

Figure 19:
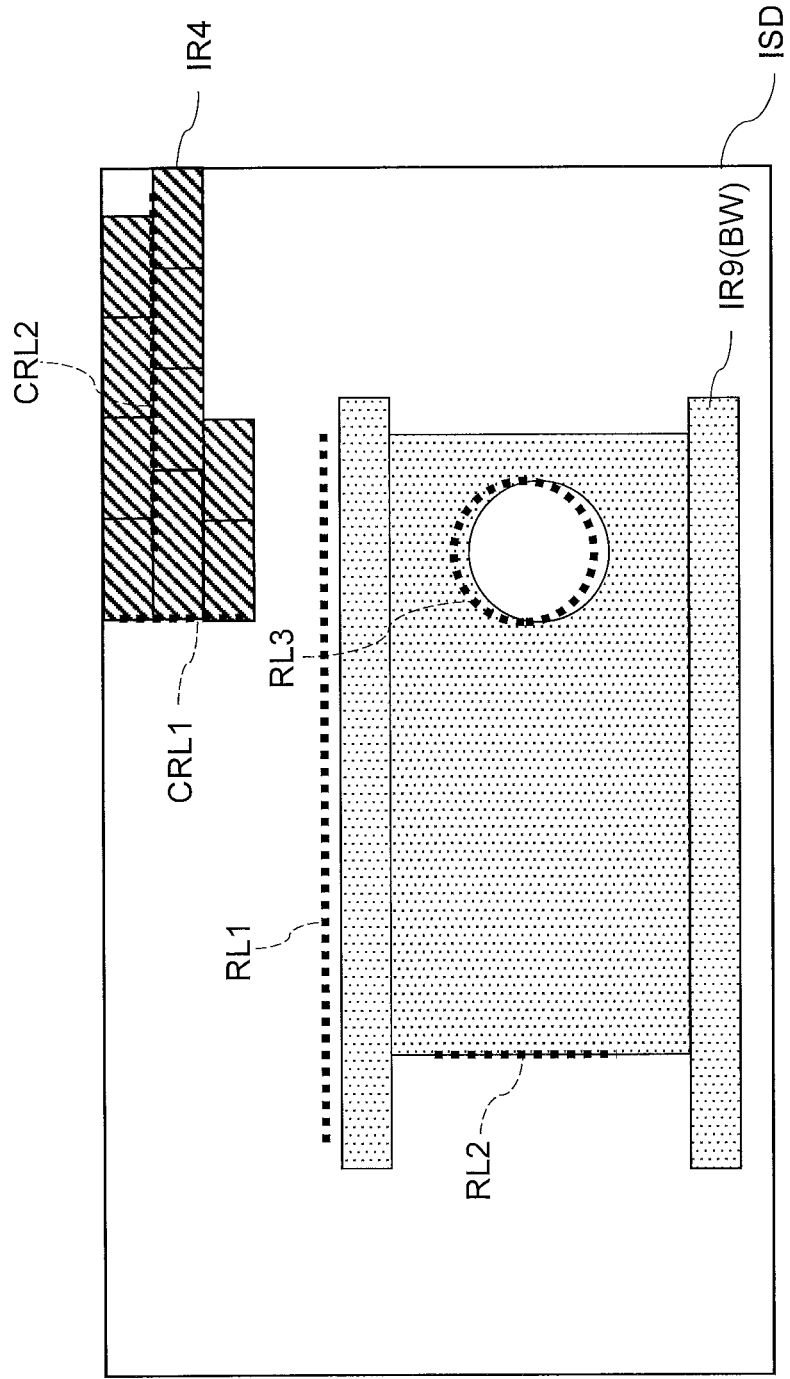
FIG. 19 is an illustration of an example fourth additional measurement combined image.

The workpiece W may be placed on both the table 2 and the additional table 2A. In light of this situation, the workpiece installation method may include: placing a second additional workpiece BW on another table 2 out of the table 2 from which the reference workpiece RW has been removed and the additional table 2A that has been placed in place of the table 2, the second additional workpiece BW being substantially identical in shape and size to the reference workpiece RW; obtaining a fourth additional measurement image that shows the second additional workpiece BW and that has been captured by the camera 4 whose configuration has been set to the target configuration; and generating, using the processor 5, a fourth additional measurement combined image ISD in which the workpiece reference lines RL1 to RL3 are superimposed on the fourth additional measurement image such that in the fourth additional measurement combined image ISD, the workpiece reference lines RL1 to RL3 are displayed at a plurality of positions respectively identical to the workpiece reference line positions. Then, the user may adjust the posture of the second additional workpiece BW on the another table so that the boundary of a ninth image area IR9, which is occupied by the second additional workpiece BW in the fourth additional measurement combined image ISD, is substantially parallel to or substantially coincident with the workpiece reference lines RL1 to RL3. FIG. 19 illustrates an example of the fourth additional measurement composite image ISD.

In an environment in which no change occurs to the positions and postures of the camera 4, the first additional camera 4A, and the second additional camera 4B, it is possible to omit, in the first embodiment, the setting of the camera setting reference lines CRL1 and CRL2 and the showing of the camera setting reference lines CRL1 and CRL2 in the measurement combined image IS. Similarly, it is possible to omit the setting of the first additional camera setting reference lines CRL3 and CRL4 and the showing of the first additional camera setting reference lines CRL3 and CRL4 in the first additional measurement combined image ISA. It is also possible to omit the setting of the second additional camera setting reference lines CRL5 and CRL6 and the showing of the second additional camera setting reference lines CRL5 and CRL6 in the second additional measurement combined image ISB. In this case, it is possible to omit steps S3, S5, S10, and S11 in FIG. 10.

The workpiece installation support program 6p and the machine learning program 6m will not be limited to the memory 6, which is provided in the image processing devices 200 and 200a, but may be recorded in a storage medium that is removable from the image processing devices 200 and 200a and is readable by the image processing devices 200 and 200a. Examples of such storage medium include: a disk such as a floppy disk, an optical disk, a CDROM, and a magnetic disk; an SD card; a USB memory; and an external hard disk.

<Operation and Effects of First Embodiment>

In the workpiece installation support systems 1 and 1a according to the first embodiment, and in the workpiece installation methods using the workpiece installation support systems 1 and 1a, the posture of the workpiece W is adjustable by referring to a plurality of reference line positions of the reference workpiece RW, whose posture has been adjusted to the workpiece reference posture. This ensures that the posture of a workpiece is more efficiently adjusted.

Second Embodiment

Figure 20:
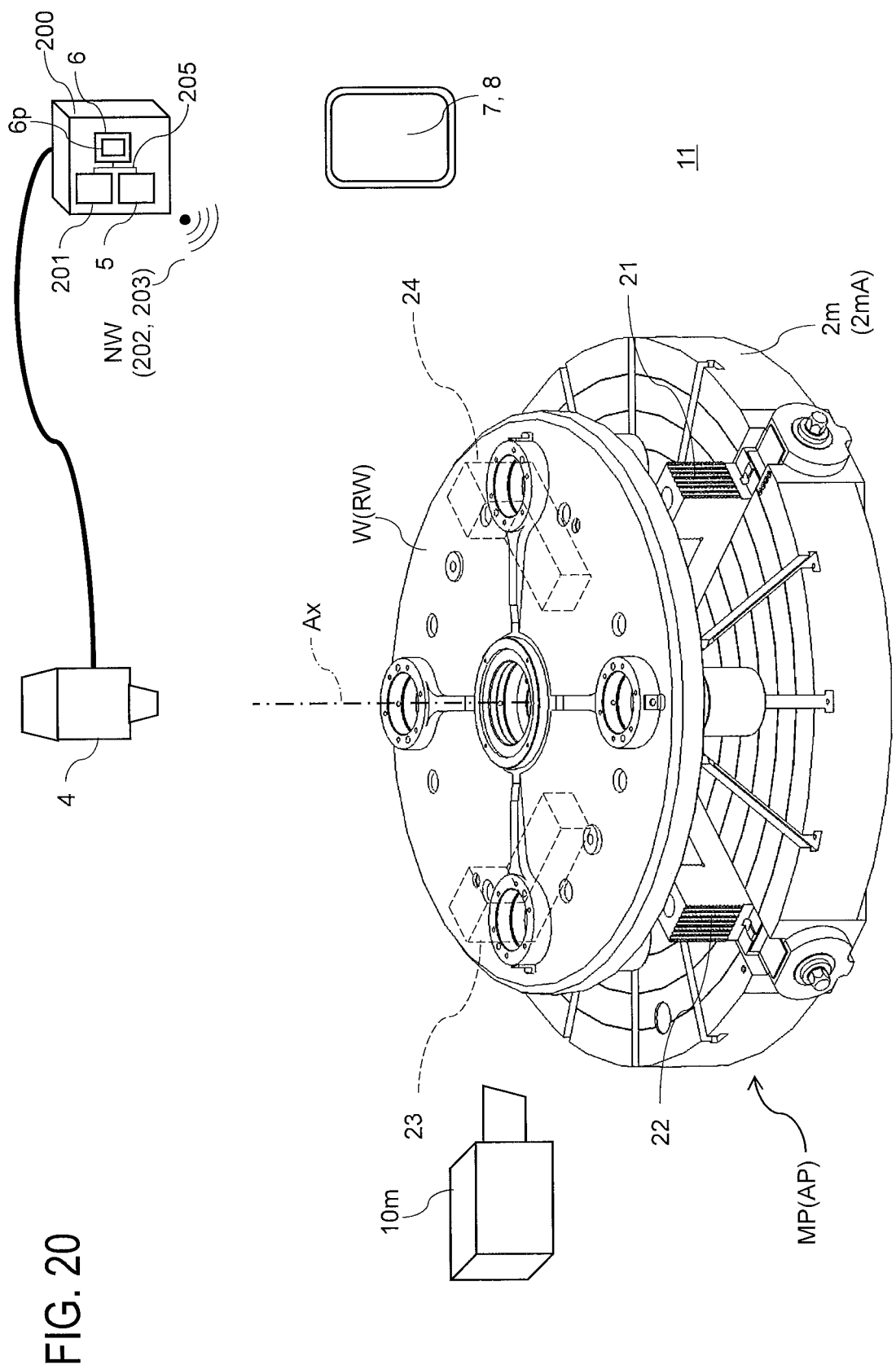
FIG. 20 is an illustration of a schematic configuration of a workpiece installation support system according to the second embodiment.

The workpiece installation methods are applicable not only to the machining apparatus 10 but also to other machining apparatuses. FIG. 20 is an illustration of a schematic configuration of a workpiece installation support system 11 according to the second embodiment. In the second embodiment, the machining apparatus 10m is a machining apparatus capable of performing both milling and turning. A table 2m fixes the reference workpiece RW and the workpiece W with locking jaws 21 to 24. The table 2m has a rotation center axis Ax and is rotatably movable about the rotation center axis Ax. While FIG. 20 illustrates an example in which the machining position MP and the arrangement position AP are the same, it is possible that as in the first embodiment, the table 2m is movable to: a machining position MP at which the reference workpiece RW and the workpiece W are machined; and an arrangement position AP spaced apart from the machining position MP. The locking jaws 21 to 24 are arranged clockwise at intervals of 90 degrees about the rotation center axis Ax. That is, in a view along an axial direction of the rotation center axis Ax, an angle of 90 degrees is formed between the direction from the rotation center axis Ax toward the locking jaw 21 and the direction from the rotation center axis Ax toward the locking jaw 22. In a view along the axial direction of the rotation center axis Ax, an angle of 90 degrees is formed between the direction from the rotation center axis Ax toward the locking jaw 22 and the direction from the rotation center axis Ax toward the locking jaw 23. In a view along the axial direction of the rotation center axis Ax, an angle of 90 degrees is formed between the direction from the rotation center axis Ax toward the locking jaw 23 and the direction from the rotation center axis Ax toward the locking jaw 24. In a view along the axial direction of the rotation center axis Ax, an angle of 90 degrees is formed between the direction from the rotation center axis Ax toward the locking jaw 24 and the direction from the rotation center axis Ax toward the locking jaw 21. The camera 4 is arranged such that its optical axis is substantially parallel to the rotation center axis Ax. In the workpiece installation support system 11, the first additional camera 4A and the second additional camera 4B are omitted from the configuration of the workpiece installation support system 1. It is to be noted, however, that as in the first embodiment, the machining apparatus 10m may include an additional table 2m, which is identical in shape and function to the table 2mA. It is also to be noted that the machining apparatus 10m may include the position measurement sensor 9, which is described in the first embodiment, and that the image processing device 200 may include the function of the machine learning program 6m. These configurations are not illustrated in FIG. 20. In the first and second embodiments, like reference numerals designate corresponding or identical configurations and processings, and such configurations and processings will not be detailed in the description of the second embodiment. Also, a configuration not described in the present embodiment is substantially identical to a corresponding configuration of the first embodiment.

Figure 21:
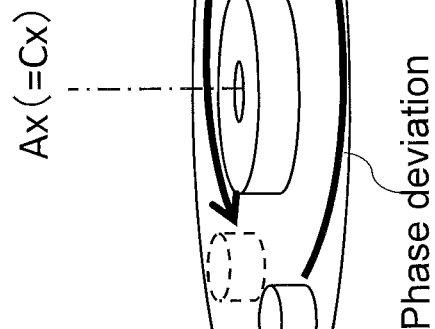
FIG. 21 is an illustration for describing the posture of a reference workpiece and the posture of a workpiece according to the second embodiment.
Figure 22:
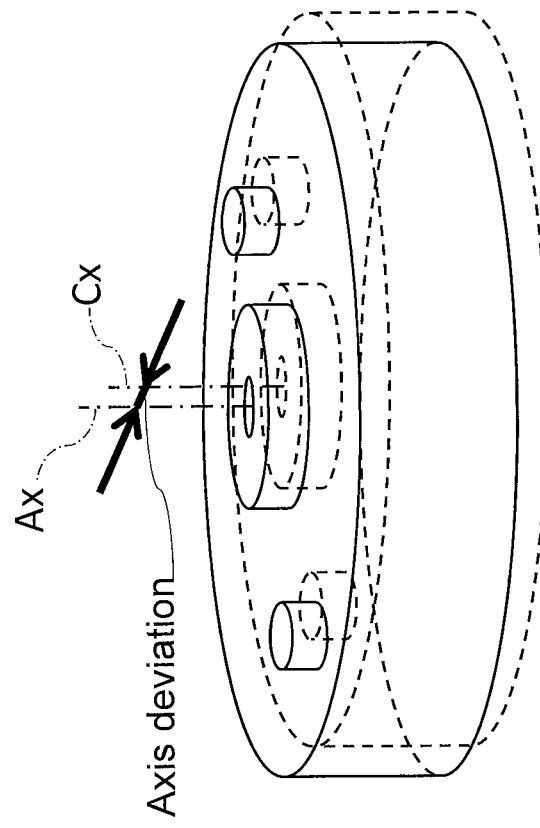
FIG. 22 is an illustration for describing the posture of the reference workpiece and the posture of the workpiece according to the second embodiment.

FIGS. 21 and 22 are illustrations for describing the posture of the reference workpiece RW and the posture of the workpiece W according to the present embodiment. As illustrated in FIG. 21, the reference workpiece RW and the workpiece W according to the present embodiment each have a center axis Cx and a shape substantially line-symmetric with respect to the center axis Cx. In the posture adjustment in the present embodiment, two things are necessary to be done, namely: make the center axis Cx of the reference workpiece RW and the workpiece W coincide with the rotation center axis Ax, as illustrated in FIG. 21; and then match the phase (rotation angle around the rotation center axis Ax) of the reference workpiece RW and the workpiece W with a predetermined phase, as illustrated in FIG. 22. As a result, the postures of the reference workpiece RW and the workpiece W are defined based on the rotation center axis Ax of the table 2.

Figure 23:
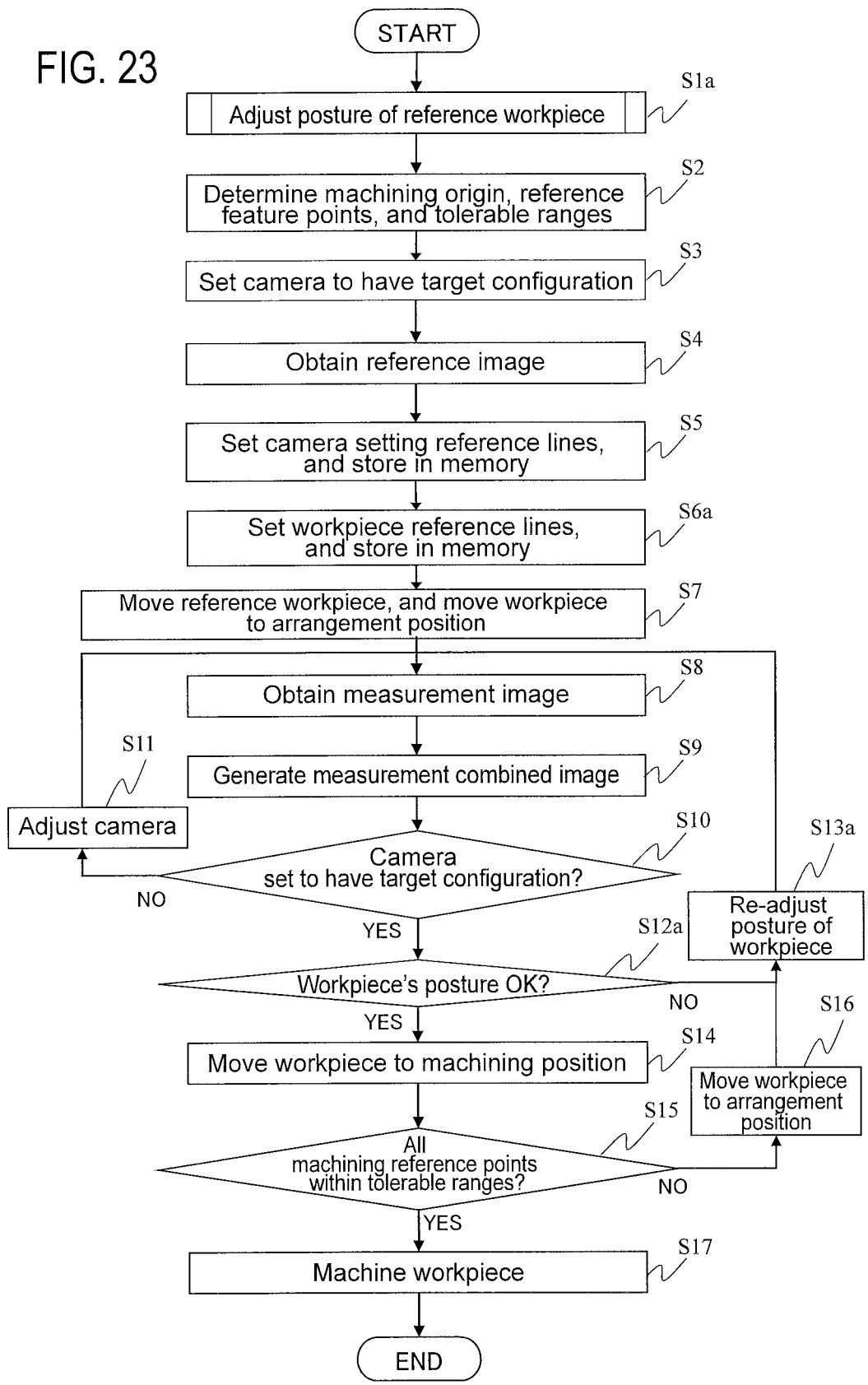
FIG. 23 is a flowchart of a workpiece installation method according to the second embodiment.
Figure 24:
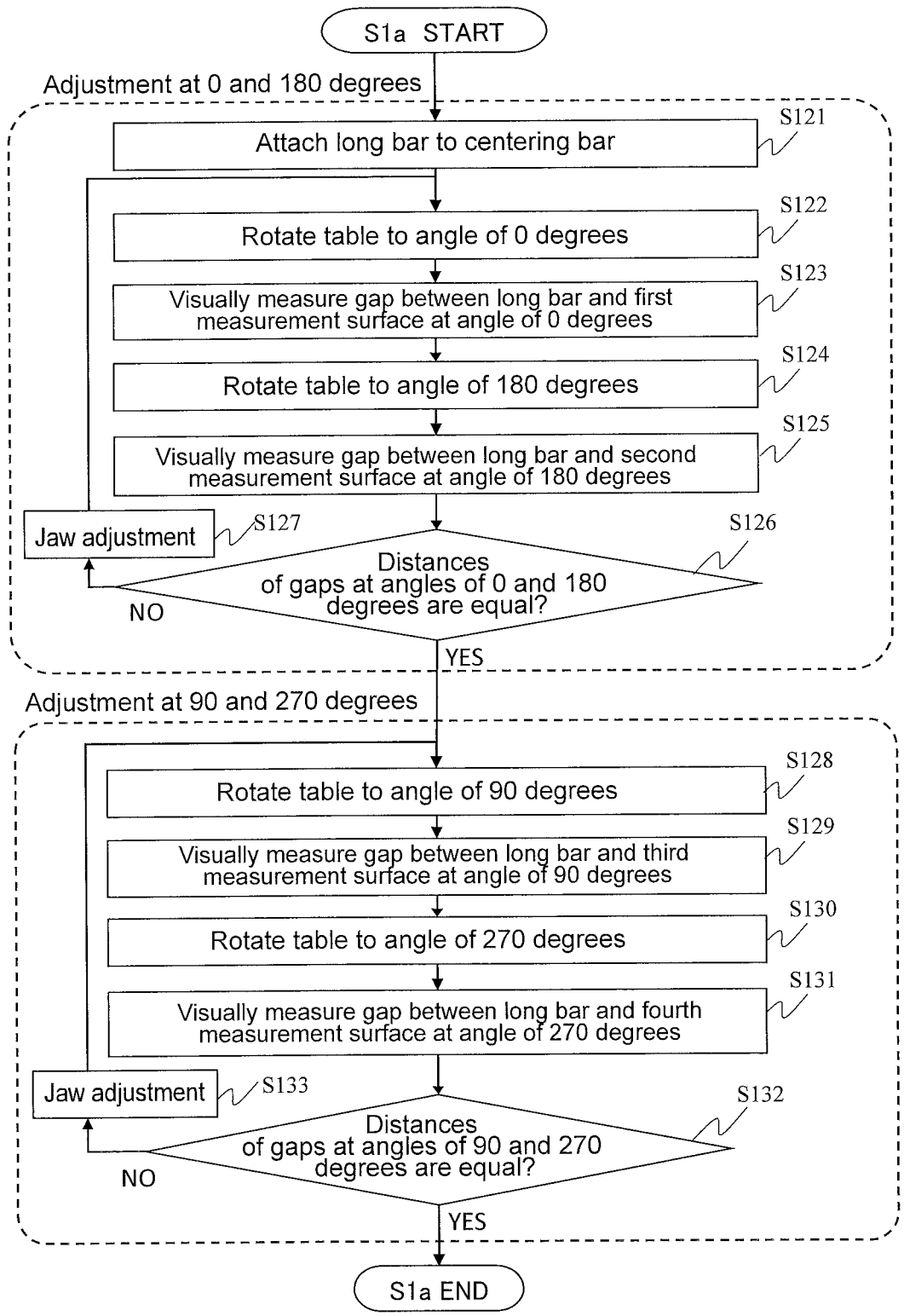
FIG. 24 is a flowchart of a method of adjusting the posture of the reference workpiece to the workpiece reference posture in the second embodiment.
Figure 25:
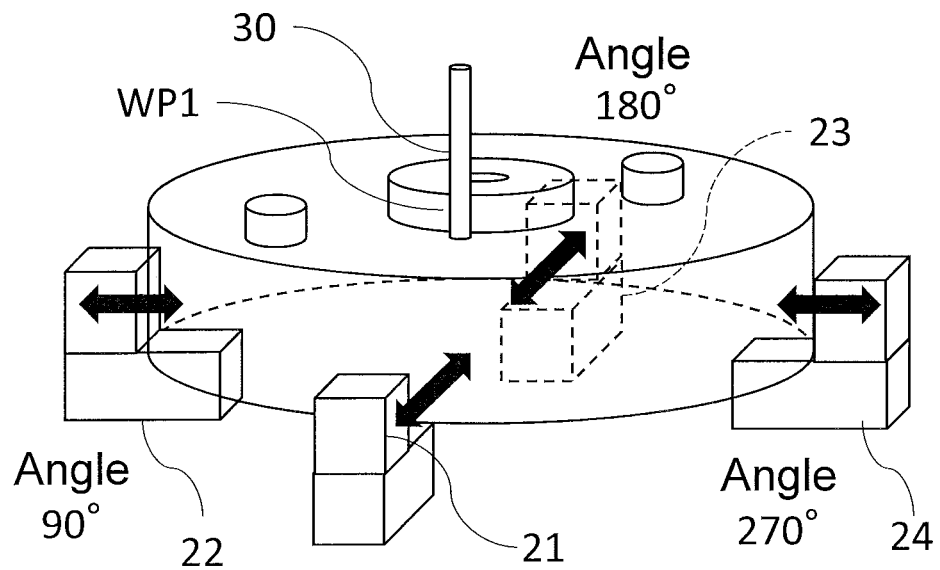
FIG. 25 is an illustration of the method of adjusting the posture of the reference workpiece according to the second embodiment.

FIG. 23 is a flowchart of the workpiece installation method according to the second embodiment. At step S1a of this method, the user places the reference workpiece RW on the table 2 and adjusts the posture of the reference workpiece RW on the table 2 so that the posture of the reference workpiece RW is the workpiece reference posture. FIG. 24 is a flowchart of specific processings performed at step S1a. First, at step S121, as illustrated in FIG. 25, a long bar 30 is attached to a centering bar (an example of the position measurement sensor 9). The center axis of the long bar 30 is adjusted to be parallel to the rotation center axis Ax. The radius of the long bar 30 is uniform with respect to an axial direction of the central axis of the long bar 30. Next, at step S122, the table 2 is rotated to an angle of 0 degrees. The angle of 0 degrees defines the rotation angle at which the long bar 30 is positioned between the rotation center axis Ax and the locking jaw 21 in a view along the axial direction of the rotation center axis Ax. At step S123, the gap between the long bar 30 and a first measurement surface WP1 is visually measured at the angle of 0 degrees. The first measurement surface WP1 is parallel to the rotation center axis Ax when the posture of the reference workpiece RW is adjusted in the manner illustrated in FIG. 22. With this configuration, the posture of the reference workpiece RW is adjusted so that the distance of the gap between the long bar 30 and the first measurement surface WP1 is uniform with respect to the axial direction of the center axis of the long bar 30.

Figure 26:
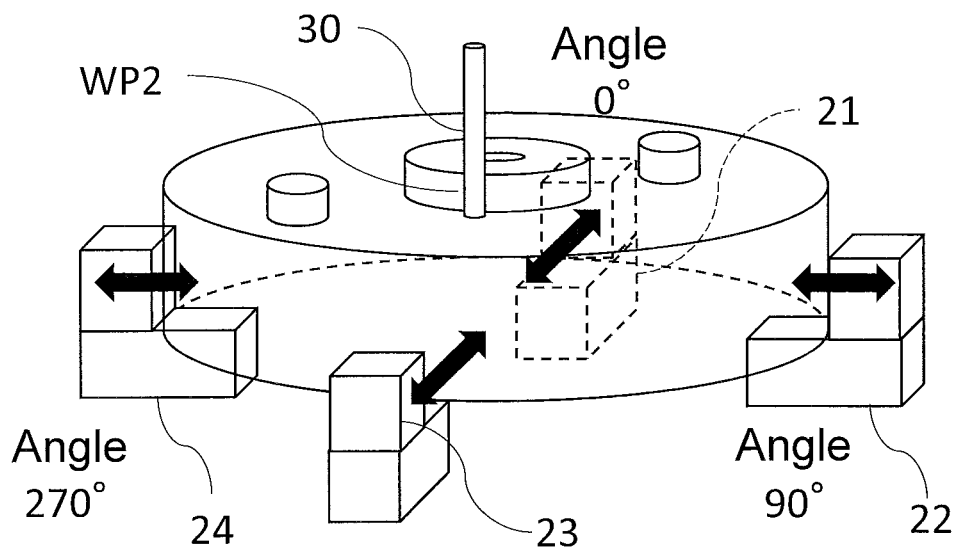
FIG. 26 is an illustration of the method of adjusting the posture of the reference workpiece according to the second embodiment.

Next, at step S124, the table 2 is rotated by an angle of 180 degrees. At this rotation, as illustrated in FIG. 26, the reference workpiece RW and the table 2 are rotated about the rotation center axis Ax so that the long bar 30 is positioned between the rotation center axis Ax and the locking jaw 23. It is to be noted, however, that the long bar 30 maintains the position and posture illustrated in FIG. 25. At these position and posture, a second measurement surface WP2 faces the long bar 30. The second measurement surface WP2 is a surface opposite to the first measurement surface WP1 with respect to the rotation center axis Ax. At step S125, the gap between the long bar 30 and the second measurement surface WP2 is visually measured at the angle of 180 degrees. Here, the second measurement surface WP2 is substantially parallel to the rotation center axis Ax. At step S126, a determination is made as to whether the distances of the gaps at the angles of 0 degrees and 180 degrees are equal to each other. When the distances of the gaps at the angles of 0 degrees and 180 degrees are not equal (No at step S126), there is an axis deviation as illustrated in FIG. 21. In light of this situation, at step S127, the locking jaws 21 and 23 are adjusted such that the reference workpiece RW is made to slide in a direction perpendicular to the rotation center axis Ax. Then, the processings performed at step S127 and steps S122 to S126 are repeated until the distances of the gaps at the angles of 0 degrees and 180 degrees are equal to each other (Yes at step S126).

Figure 27:
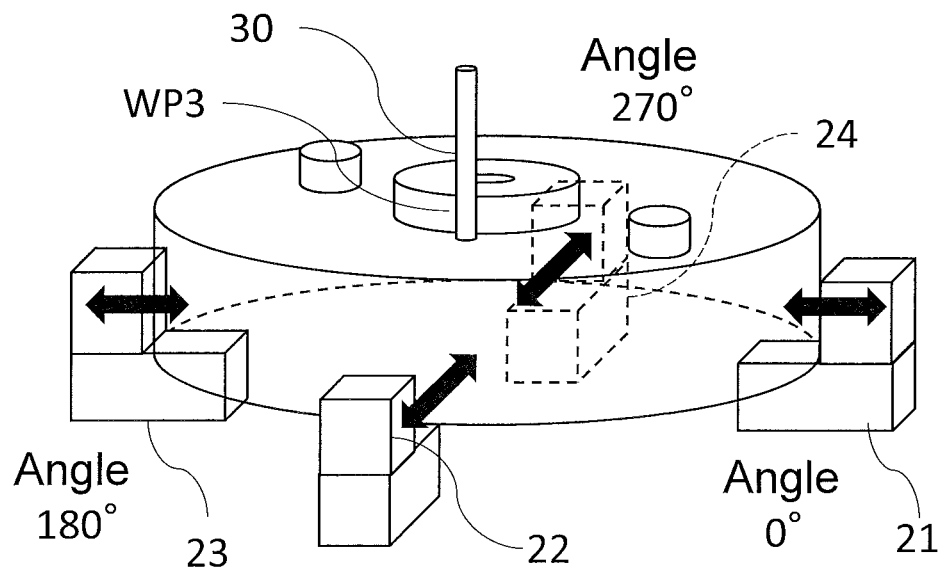
FIG. 27 is an illustration of the method of adjusting the posture of the reference workpiece according to the second embodiment.

When the distances of the gaps at the angles of 0 degrees and 180 degrees are equal to each other (Yes at step S126), then at step S128, the table 2 is rotated by an angle of 90 degrees. At this rotation, as illustrated in FIG. 27, the reference workpiece RW and the table 2 are rotated about the rotation center axis Ax so that the long bar 30 is positioned between the rotation center axis Ax and the locking jaw 22. It is to be noted, however, that the long bar 30 maintains the position and posture illustrated in FIG. 25. At step S129, the gap between the long bar 30 and a third measurement surface WP3 is visually measured at the angle of 90 degrees. Similarly to the first measurement surface WP1, the third measurement surface WP3 is parallel to the rotation center axis Ax when the posture of the reference workpiece RW is adjusted in the manner illustrated in FIG. 22. With this configuration, the posture of the reference workpiece RW is adjusted so that the distance of the gap between the long bar 30 and the third measurement surface WP3 is uniform with respect to the axial direction of the center axis of the long bar 30.

Figure 28:
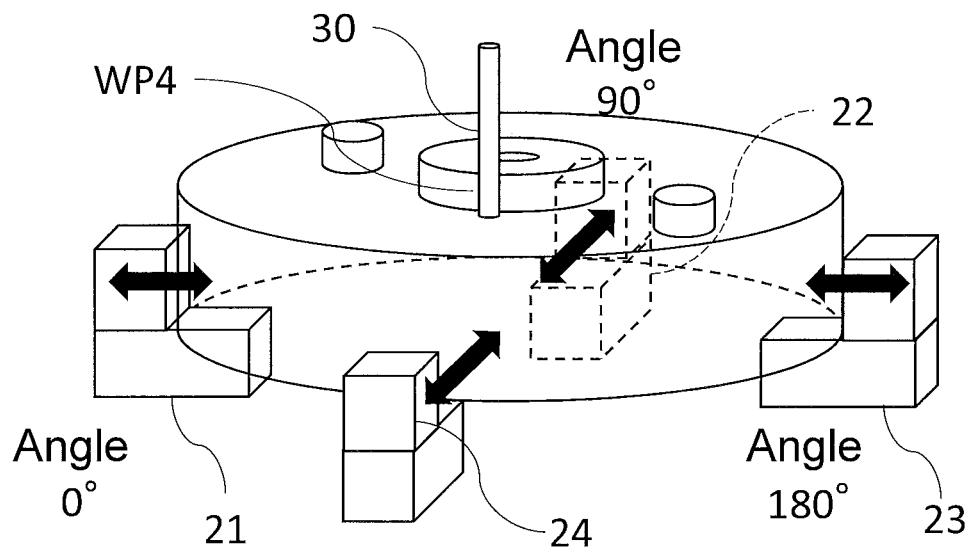
FIG. 28 is an illustration of the method of adjusting the posture of the reference workpiece according to the second embodiment.

Next, at step S130, the table 2 is rotated by an angle of 270 degrees. At this rotation, as illustrated in FIG. 28, the reference workpiece RW and the table 2 are rotated about the rotation center axis Ax so that the long bar 30 is positioned between the rotation center axis Ax and the locking jaw 24. It is to be noted, however, that the long bar 30 maintains the position and posture illustrated in FIG. 25. At these position and posture, a fourth measurement surface WP4 faces the long bar 30. The fourth measurement surface WP4 is a surface opposite to the third measurement surface WP3 with respect to the rotation center axis Ax. At step S131, the gap between the long bar 30 and the fourth measurement surface WP4 is visually measured at the angle of 270 degrees. Here, the fourth measurement surface WP4 is substantially parallel to the rotation center axis Ax. At step S132, a determination is made as to whether the distances of the gaps at the angles of 90 degrees and 270 degrees are equal to each other. When the distances of the gaps at the angles of 90 degrees and 270 degrees are not equal (No at step S132), there is an axis deviation as illustrated in FIG. 21. In light of this situation, at step S133, the locking jaws 22 and 24 are operated such that the reference workpiece RW is made to slide in a direction perpendicular to the rotation center axis Ax. Then, the processings performed at step S133 and steps S128 to S132 are repeated until the distances of the gaps at the angles of 90 degrees and 270 degrees are equal to each other (Yes at step S132).

Figure 29:
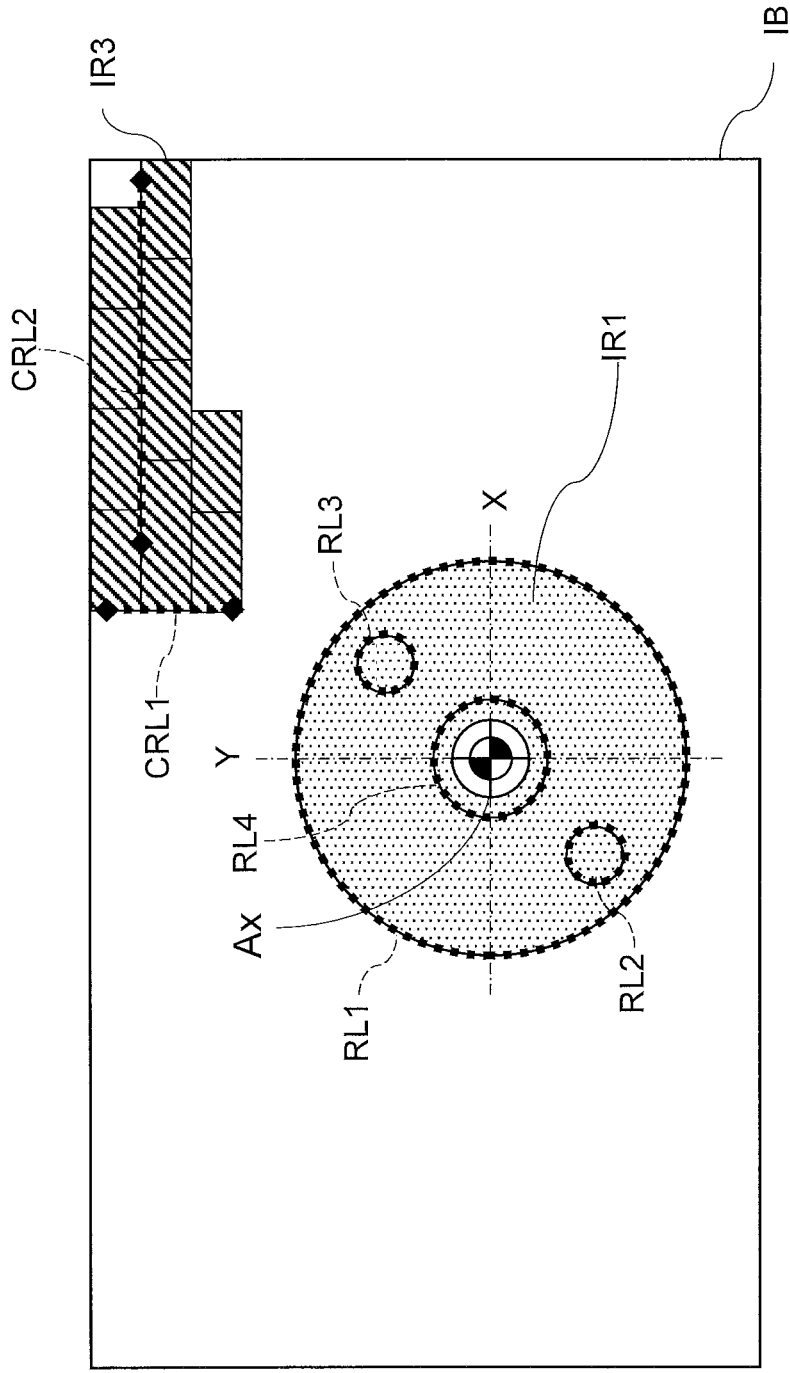
FIG. 29 is an illustration of an example reference image according to the second embodiment.

Referring again to FIG. 23, the processings at steps S2 to S5, which are performed in the first embodiment, are performed. At step S6a, workpiece reference lines are set. FIG. 29 illustrates an example of the reference image IR At step 6a, the user takes a look at the reference image IB displayed on the display 8 and illustrated in FIG. 29. While taking a look at the reference image IB, the user sets, via the input device 7, the workpiece reference lines RL1 to RL4 on the boundary of the first image area IR1, which is occupied by the reference workpiece RW in the reference image IB. It is to be noted that in this setting, it is preferable to set both workpiece reference lines RL1 and RL4 that are not affected by a phase deviation (shift) and workpiece reference lines RL2 and RL3 that are affected by a phase deviation. Then, the processings at steps S7 to S11, which are performed in the first embodiment, are performed. At steps S12a and S13a, the posture of the workpiece W is adjusted.

Figure 30:
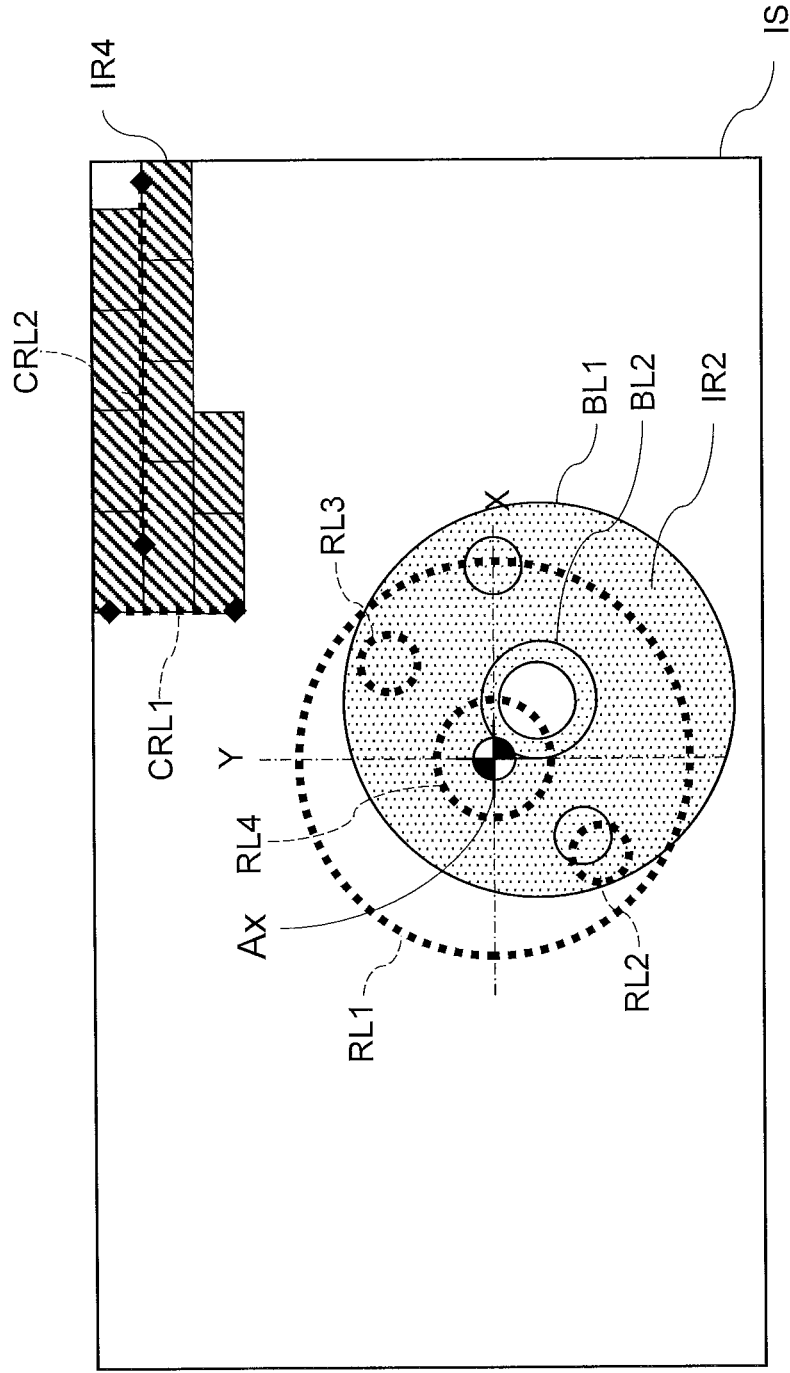
FIG. 30 is an illustration of an example measurement combined image according to the second embodiment.
Figure 31:
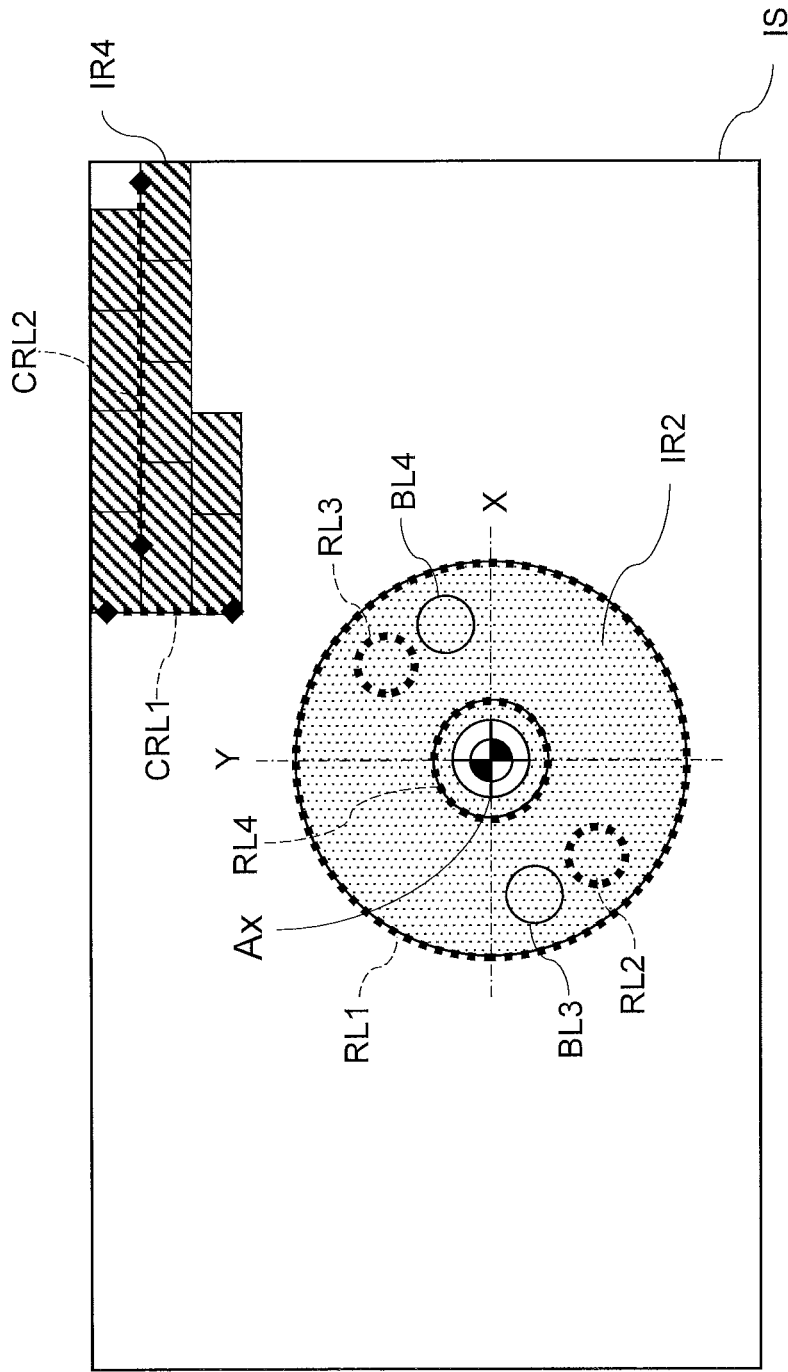
FIG. 31 is an illustration of an example measurement combined image showing ongoing adjustment of the posture of the workpiece according to the second embodiment.
Figure 32:
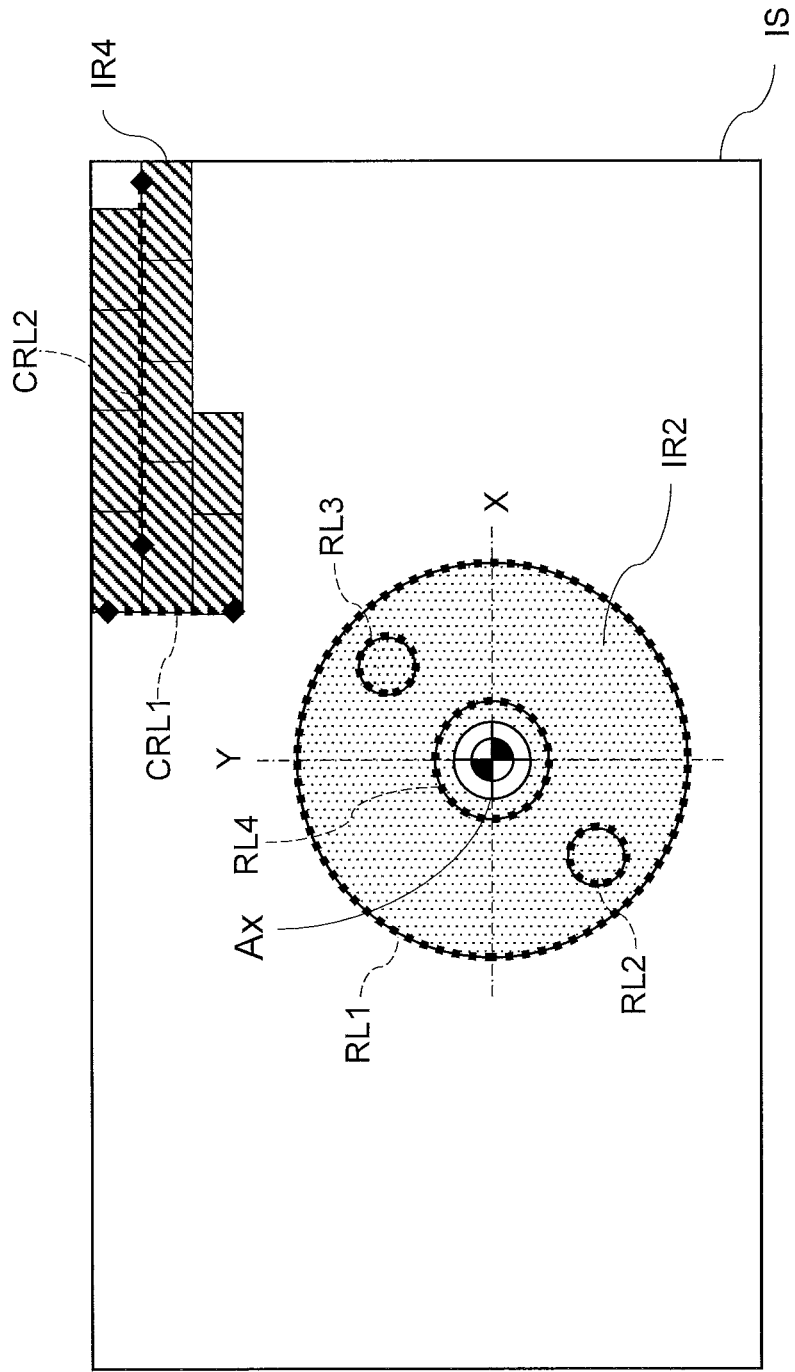
FIG. 32 is an illustration of an example measurement combined image according to the second embodiment with the posture of the workpiece adjusted.

FIG. 30 illustrates an example of the measurement combined image IS according to the second embodiment. In the measurement combined image IS illustrated in FIG. 30, the second image area IR2, which is occupied by the workpiece W, is indicated by a polka-dot pattern. Also in the measurement combined image IS, the boundary of the fourth image area. IR4, which is occupied by the stationary object and corresponds to the third image area IR3, is indicated by hatching. The first embodiment permits the case where the boundary of the second image area IR2, which is occupied by the workpiece W in the measurement combined image IS, is substantially parallel to the workpiece reference lines RL1 to RL3. In the second embodiment, however, the user adjusts the posture of the workpiece W on the table 2 such that the boundary of the second image area IR2, which is occupied by the workpiece W in the measurement combined image IS, and the workpiece reference lines RL1 to RL4 are substantially coincident with each other. In FIG. 30, there are an axis deviation such as the one illustrated in FIG. 21 and a phase deviation such as the one illustrated in FIG. 22. In light of this situation, the posture of the workpiece W is adjusted by operating the locking jaws 21 to 24 so that the workpiece reference lines RL1 and RL4, which are not affected by the phase deviation, are substantially coincident with the boundary lines BL1 and BL2, respectively. of the second image region IR2. FIG. 31 illustrates an example of the content shown in the measurement composite image IS adjusted in the above-described manner. Next, the workpiece W and the table 2 are rotated about the rotation center axis Ax so that the remaining workpiece reference lines RL2 and RL3 are substantially coincident with the boundary lines BL1 and BL2, respectively, of the second image region IR2. FIG. 32 illustrates an example of the measurement composite image IS showing the workpiece W whose posture has been adjusted in the above-described manner. It is to be noted that while FIGS. 29 to 31 illustrate a case where all the workpiece reference lines RL1 to RL4 are defined by circles, the workpiece reference lines may include a straight workpiece reference line(s).

Referring again to FIG. 23, a determination is made as to whether all the workpiece reference lines RL1 to RL4 are substantially coincident with the boundary of the second image area IR2, which is occupied by the workpiece W. When not all the workpiece reference lines RL1 to RL4 are substantially coincident with the boundary of the second image area IR2 (No at step S12a), then at step S13a, the locking jaws 21 to 24 are operated, or the workpiece W and the table 2 are rotated about the rotation center axis Ax. Then, the processings performed at step S13a and steps S8 to S13a are repeated until all the workpiece reference lines RL1 to RL4 are substantially coincident with the boundary of the second image area IR2. When all the workpiece reference lines RL1 to RL4 are substantially coincident with the boundary of the second image area IR2 (Yes at step S12a), the processings at steps S15 to S17 are performed.

Operation and Effects of Second Embodiment

In the workpiece installation support system 11 according to the second embodiment, and in the workpiece installation method using the workpiece installation support system 11, a combined image is used to perform the laborious work of installing a workpiece W to a four-jaw table. By using a combined image, the installment time is shortened.

In the present disclosure, the term "comprise" and its variations are intended to mean open-ended terms, not excluding any other elements and/or components that are not recited herein. The same applies to the terms "include", "have", and their variations.

In the present disclosure, a component suffixed with a term such as "member", "portion", "part", "element", "body", and "structure" is intended to mean that there is a single such component or a plurality of such components.

In the present disclosure, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

In the present disclosure, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

In the present disclosure, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:
1. A workpiece installation method comprising:
   placing a reference workpiece on a table;
   adjusting a posture of the reference workpiece on the table to a workpiece reference posture;
   setting a configuration of a camera configured to capture an image of the table to a target configuration in which a viewpoint position of the camera is a reference viewpoint position and a line-of-sight direction of the camera is a reference line-of-sight direction;

obtaining a reference image that shows the reference workpiece whose posture has been adjusted and that has been captured by the camera whose configuration has been set to the target configuration;

setting workpiece reference lines on a boundary of a first image area occupied by the reference workpiece in the reference image;

storing workpiece reference line positions in a memory, the workpiece reference lines passing through the workpiece reference line positions in the reference image;

placing a workpiece substantially identical in shape and size to the reference workpiece on one table out of the table from which the reference workpiece has been removed and an additional table that has been provided in place of the table;

obtaining a measurement image that shows the workpiece and that has been captured by the camera whose configuration has been set to the target configuration;

generating, using a processor, a measurement combined image in which the workpiece reference lines are superimposed on the measurement image and which shows the workpiece reference lines pass through positions respectively identical to the workpiece reference line positions; and adjusting a posture of the workpiece on the one table such that a boundary of a second image area occupied by the workpiece in the measurement combined image is shown to be substantially parallel to or substantially coincident with the workpiece reference lines.

2. The workpiece installation method according to claim 1, wherein the table and the additional table are movable to a machining position and an arrangement position apart from the machining position, the workpiece on the one table positioned at the machining position being machined by a machining apparatus, wherein the camera is configured to capture images of the reference workpiece and the workpiece that are placed on the one table moved to the arrangement position, and wherein the posture of the workpiece is adjusted on the table or the additional table moved to the arrangement position.

3. The workpiece installation method according to claim 2, wherein when the table on which the reference workpiece whose posture has been adjusted to the workpiece reference posture is placed is moved to the machining position, all positions of reference feature points are within predetermined tolerable ranges respectively corresponding to the reference feature points, the reference feature points being feature points on the shape of the reference workpiece.

4. The workpiece installation method according to claim 3, further comprising:

moving the one table on which the workpiece whose posture has been adjusted is placed to the machining position;

measuring, using a position measurement sensor of the machining apparatus, positions of machining reference points that are feature points on a shape of the workpiece which is substantially identical to the shape of the reference workpiece, the machining feature points respectively corresponding to the reference feature points; and determining, using the machining apparatus, whether the positions of the machining reference points are within the respective tolerable ranges.

5. The workpiece installation method according to claim 4, further comprising:

outputting a determination allowing machining by the machining apparatus to control the machining apparatus to machine the workpiece, when all the positions of the machining reference points are determined to be within the respective tolerable ranges; and outputting a determination disallowing the machining to move, to the arrangement position, the one table on which the workpiece is placed and which has been moved to the machining position, when at least one position of the machining reference points is determined to be out of the tolerable range.

6. The workpiece installation method according to claim 5, further comprising:

determining, based on a third additional measurement image captured by the camera whose configuration has been set to the target configuration and showing a first additional workpiece substantially identical to the reference workpiece in shape and size, whether all positions of first additional machining reference points are within tolerable ranges respectively corresponding to the first additional machining reference points when the one table on which the first additional workpiece is placed is moved to the machining position, the first additional machining reference points being feature points on a shape of the first additional workpiece which is substantially identical to the shape of the reference workpiece, the first additional machining reference points respectively corresponding to the reference feature points, using a machine learning model that has been learned using teaching data, an input of the teaching data comprising the measurement image and the workpiece reference lines, an output of the teaching data comprising at least one of the determination allowing the machining, the determination disallowing the machining, a determination as to whether each machining reference point of the machining reference points is within the tolerable range corresponding to the each machining reference point, and an amount of deviation of the each machining reference point from a center value of the corresponding tolerable range.

7. The workpiece installation method according to claim 6, wherein the machine learning model has been learned using the teaching data, the input of the teaching data additionally comprising at least one of an edge detected from the measurement image, an amount of deviation of each workpiece reference line position of the workpiece reference line positions from a center of the image, a focal length of a lens of the camera, and a distortion parameter of the camera.

8. The workpiece installation method according to claim 1, wherein the posture of the reference workpiece and the posture of the workpiece are defined based on a rotation center axis of the table or defined by a rotation angle around a coordinate axis of a coordinate system, the coordinate system being set for the machining apparatus to perform a machining program.

9. The workpiece installation method according to claim 1, wherein at least one of the workpiece reference lines is defined by an edge of the boundary of the first image area, the edge being obtained by image processing performed by the processor.

10. The workpiece installation method according to claim 1, wherein each of the workpiece reference lines is defined by a straight line or a circle.

11. The workpiece installation method according to claim 1, further comprising:
setting camera setting reference lines on a boundary of a third image area occupied by a stationary object in a background of the reference image,
wherein camera setting reference line positions are further stored in the memory, the camera setting reference lines passing through the camera setting reference line positions in the reference image,
wherein the measurement combined image is generated using the processor such that the camera setting reference lines are superimposed on the measurement image in the measurement combined image and the measurement combined image shows the camera setting reference lines pass through positions respectively identical to the camera setting reference line positions, and
wherein the configuration of the camera is set to the target configuration by adjusting the viewpoint position and the line-of-sight direction of the camera such that a boundary of a fourth image area occupied by the stationary object in the measurement combined image overlaps with the camera setting reference lines.

12. The workpiece installation method according to claim 1, further comprising:
setting a configuration of a first additional camera configured to capture an image of the table to a first additional target configuration in which a viewpoint position of the first additional camera is a first additional reference position different from the reference viewpoint position and a line-of-sight direction of the first additional camera is a first additional reference line-of-sight direction non-parallel to the reference line-of-sight direction;
setting a configuration of a second additional camera configured to capture an image of the table to a second additional target configuration in which a viewpoint position of the second additional camera is a second additional reference position different from the reference viewpoint position and the first additional reference position and a line-of-sight direction of the second additional camera is a second additional reference line-of-sight direction non-parallel to the reference line-of-sight direction and the first additional reference line-of-sight direction;
obtaining a first additional reference image that shows the reference workpiece whose posture has been adjusted and that has been captured by the first additional camera whose configuration has been set to the first additional target configuration;
obtaining a second additional reference image that shows the reference workpiece whose posture has been adjusted and that has been captured by the second additional camera whose configuration has been set to the second additional target configuration;
setting first additional workpiece reference lines on a boundary of a fifth image area occupied by the reference workpiece in the first additional reference image;
setting second additional workpiece reference lines on a boundary of a sixth image area occupied by the reference workpiece in the second additional reference image;
storing first additional workpiece reference line positions in the memory, the first additional workpiece reference lines passing through the first additional workpiece reference line positions in the first additional reference image;
storing second additional workpiece reference line positions in the memory, the second additional workpiece reference lines passing through the second additional workpiece reference line positions in the second additional reference image;
obtaining a first additional measurement image that shows the workpiece and that has been captured by the first additional camera whose configuration has been set to the first additional target configuration;
obtaining a second additional measurement image that shows the workpiece and that has been captured by the second additional camera whose configuration has been set to the second additional target configuration;
generating, using the processor, a first additional measurement combined image in which the first additional workpiece reference lines are superimposed on the first additional measurement image and which shows the first additional workpiece reference lines pass through positions respectively identical to the first additional workpiece reference line positions;
generating, using the processor, a second additional measurement combined image in which the second additional workpiece reference lines are superimposed on the second additional measurement image and which shows the second additional workpiece reference lines pass through positions respectively identical to the second additional workpiece reference line positions;
adjusting the posture of the workpiece on the one table such that a boundary of a seventh image area occupied by the workpiece in the first additional measurement combined image is shown to be substantially parallel to or substantially coincident with the first additional workpiece reference lines; and
adjusting the posture of the workpiece on the one table such that a boundary of an eighth image area occupied by the workpiece in the second additional measurement combined image is shown to be substantially parallel to or substantially coincident with the second additional workpiece reference lines.

13. The workpiece installation method according to claim 1, further comprising:
placing a second additional workpiece on another table out of the table from which the reference workpiece has been removed and the additional table that has been provided in place of the table, the second additional workpiece being substantially identical in shape and size to the reference workpiece;
obtaining a fourth additional measurement image that shows the second additional workpiece and that has been captured by the camera whose configuration has been set to the target configuration;
generating, using the processor, a fourth additional measurement combined image in which the workpiece reference lines are superimposed on the fourth additional measurement image and which shows the workpiece reference lines pass through positions respectively identical to the workpiece reference line positions; and
adjusting a posture of the second additional workpiece on the another table such that a boundary of a ninth image area occupied by the second additional workpiece in the fourth additional measurement combined image is shown to be substantially parallel to or substantially coincident with the workpiece reference lines.

14. A workpiece installation support system comprising:
a table on which a workpiece and a reference workpiece are alternatively replaceable so as to adjust a posture of the workpiece and a posture of the reference workpiece, the workpiece being substantially identical in shape and size to the reference workpiece;
a camera configured to capture an image of the reference workpiece and the workpiece on the table;
an input device via which workpiece reference lines are set on a boundary of a first image area occupied by the reference workpiece in a reference image that has been captured by the camera and that shows the reference workpiece whose posture has been adjusted to a workpiece reference posture;
a memory configured to store workpiece reference line positions, the workpiece reference lines passing through the work reference line positions in the reference image;
a processor configured to generate a measurement combined image by superimposing the workpiece reference lines on a measurement image that shows the workpiece captured by the camera when the posture of the workpiece was adjusted on the table such that in the measurement combined image, the workpiece reference lines pass through positions respectively identical to the workpiece reference line positions; and
a display configured to display the measurement combined image when the measurement image is captured.

15. A workpiece installation support method comprising:
obtaining a reference image that shows a reference workpiece placed on a table and that has been captured by a camera, the reference workpiece having a posture adjusted to a workpiece reference posture, a configuration of the camera being set to a target configuration in which a viewpoint position of the camera is a reference viewpoint position and a line-of-sight direction of the camera is a reference line-of-sight direction;

setting workpiece reference lines on a boundary of a first image area occupied by the reference workpiece in the reference image;

storing workpiece reference line positions in a memory, the workpiece reference lines passing through the workpiece reference line positions in the reference image;

obtaining a measurement image that shows a workpiece placed on one table and that has been captured by the camera whose configuration has been set to the target configuration, the workpiece being substantially identical in shape and size to the reference workpiece, the one table being out of the table from which the reference workpiece has been removed and an additional table provided in place of the table;

generating a measurement combined image in which the workpiece reference lines are superimposed on the measurement image and which shows the workpiece reference lines pass through positions respectively identical to the workpiece reference line positions; and displaying the measurement combined image on a display.

* * * * *